United States Patent [19]

Iizawa et al.

[11] Patent Number: 5,495,567
[45] Date of Patent: *Feb. 27, 1996

[54] AUTOMATIC INTERFACE LAYOUT GENERATOR FOR DATABASE SYSTEMS

[75] Inventors: Atsushi Iizawa, Tokyo; Yukari Yoshiura, Kanagawa, both of Japan; Arturo Pizano, Milpitas, Calif.

[73] Assignees: Ricoh Company Ltd., Tokyo, Japan; Ricoh Corporation, San Jose, Calif.

[ * ] Notice: The term of this patent shall not extend beyond the expiration date of Pat. No. 5,353,401.

[21] Appl. No.: 95,105

[22] Filed: Jul. 20, 1993

Related U.S. Application Data

[63] Continuation-in-part of Ser. No. 973,057, Nov. 6, 1992, Pat. No. 5,353,401.

[51] Int. Cl.$^6$ .................................................. G06F 17/00
[52] U.S. Cl. .............................................. 395/161; 395/155
[58] Field of Search ................................. 395/155, 156, 395/159, 161, 921

[56] References Cited

U.S. PATENT DOCUMENTS 5,311,443  5/1994  Crain et al. ............................. 395/921
5,327,529  7/1994  Fults et al. .............................. 395/155
5,335,320  8/1994  Iwata et al. ............................ 395/155
5,379,373  1/1995  Hayashi et al. ........................ 395/148
5,404,441  4/1995  Satoyama ............................... 395/155

Primary Examiner—Mark K. Zimmerman
Assistant Examiner—Joseph R. Burwell
Attorney, Agent, or Firm—Flehr, Hohbach, Test, Albritton & Herbert

[57] ABSTRACT

An automatic interface layout generator for database systems is disclosed herein. The automatic generator includes a specification tool for specifying a set of block descriptions representative of specified portions of a database. A block layout generator produces interface objects to be included within an interface of the database, wherein each of the interface objects corresponds to one of the block descriptions and includes a plurality of layout fields. A layout quality parameter is determined for each of the interface objects based on arrangement of the layout fields within the interface objects. A block placement generator arranges sets of the interface objects into block configurations within the interface. A placement quality parameter for each of the block configurations is derived based on a set of block placement rules and on the layout quality parameters, and a final block configuration is selected by comparing the placement quality parameters corresponding to particular block configurations.

17 Claims, 24 Drawing Sheets

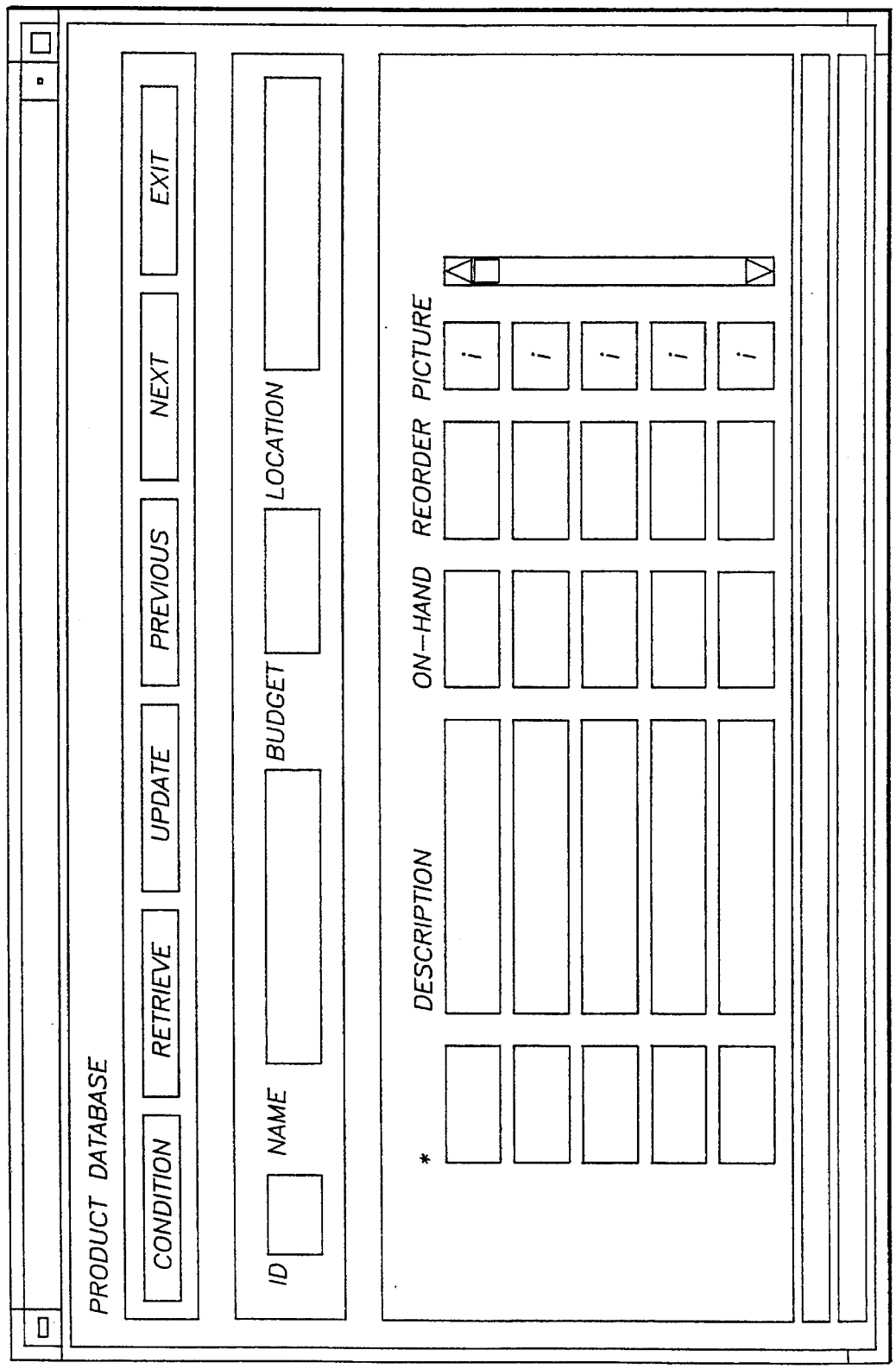
FIG.—3B

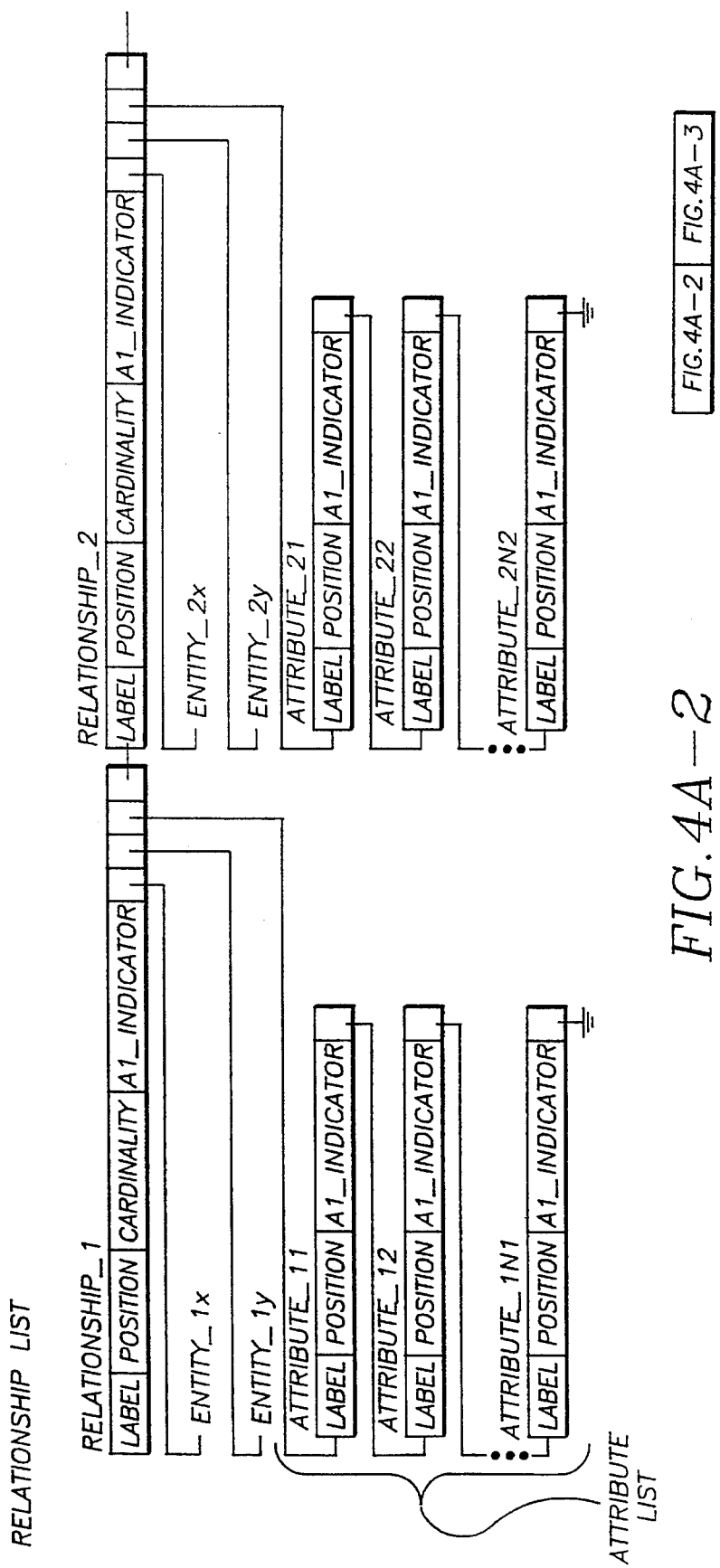

PRODUCT DATABASE

| CONDITION | RETRIEVE | UPDATE | PREVIOUS | NEXT | EXIT |

ORDERS

| NUMBER | DATE | DOC_IMAGE |
|---|---|---|
| 101 | 03/31/93 | i |
| 104 | 03/31/93 | i |
| 109 | 03/31/93 | i |
| 111 | 03/31/93 | i |
| 116 | 03/31/93 | i |

ITEMS

| NUMBER | DESCRIPTION | QUANTITY |
|---|---|---|
| K3246 | PEN NO.3—RED | 50 |
| T0095 | ULTRA FINE PEN NO. 1—BLACK | 50 |
| U9205 | WHITE BOARD MARKER | 15 |
| B2143 | WHITE BOARD ERASER | 3 |
|  |  |  |

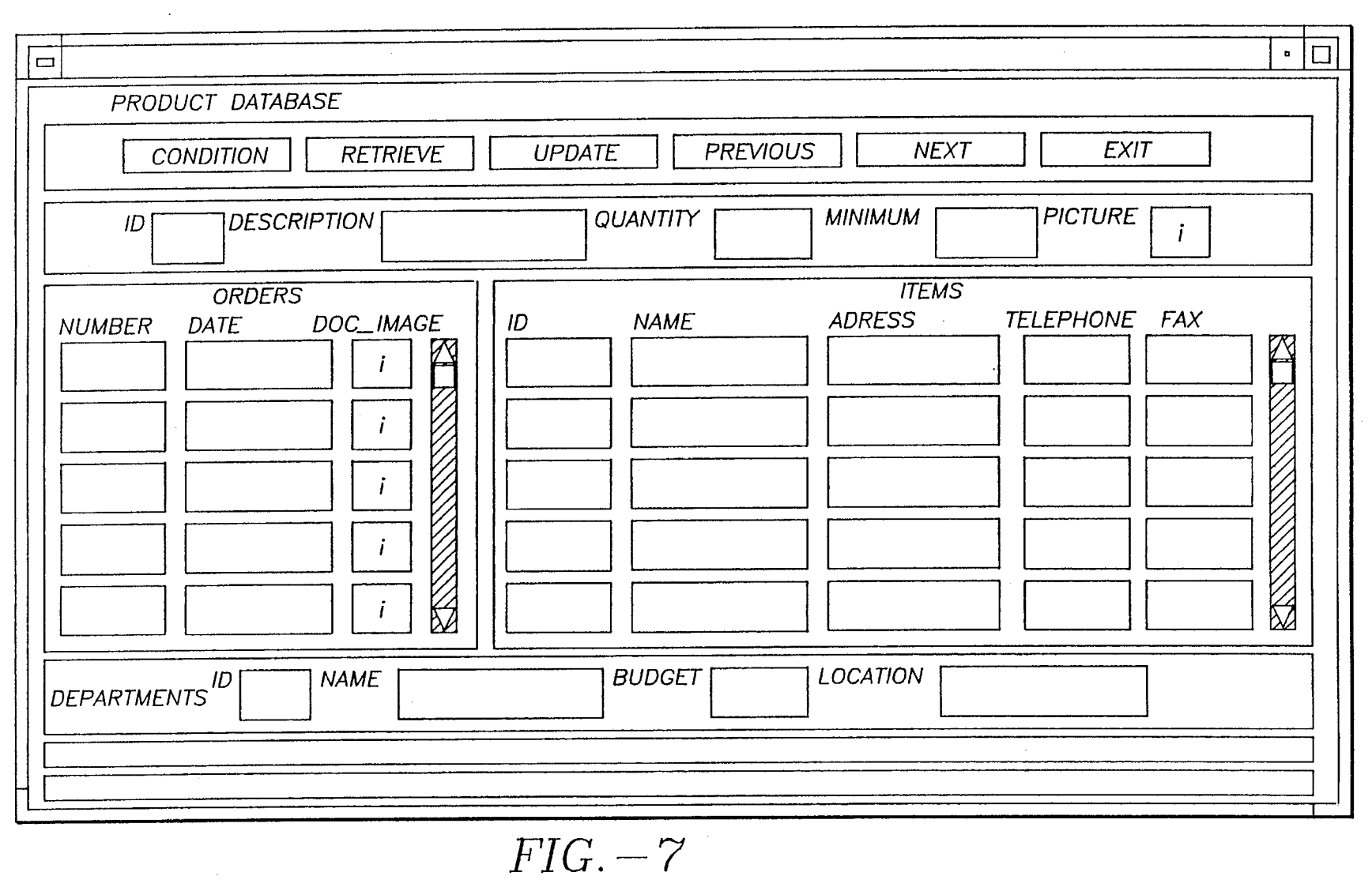

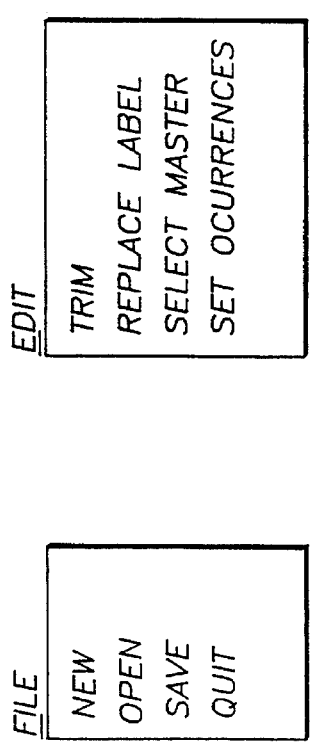

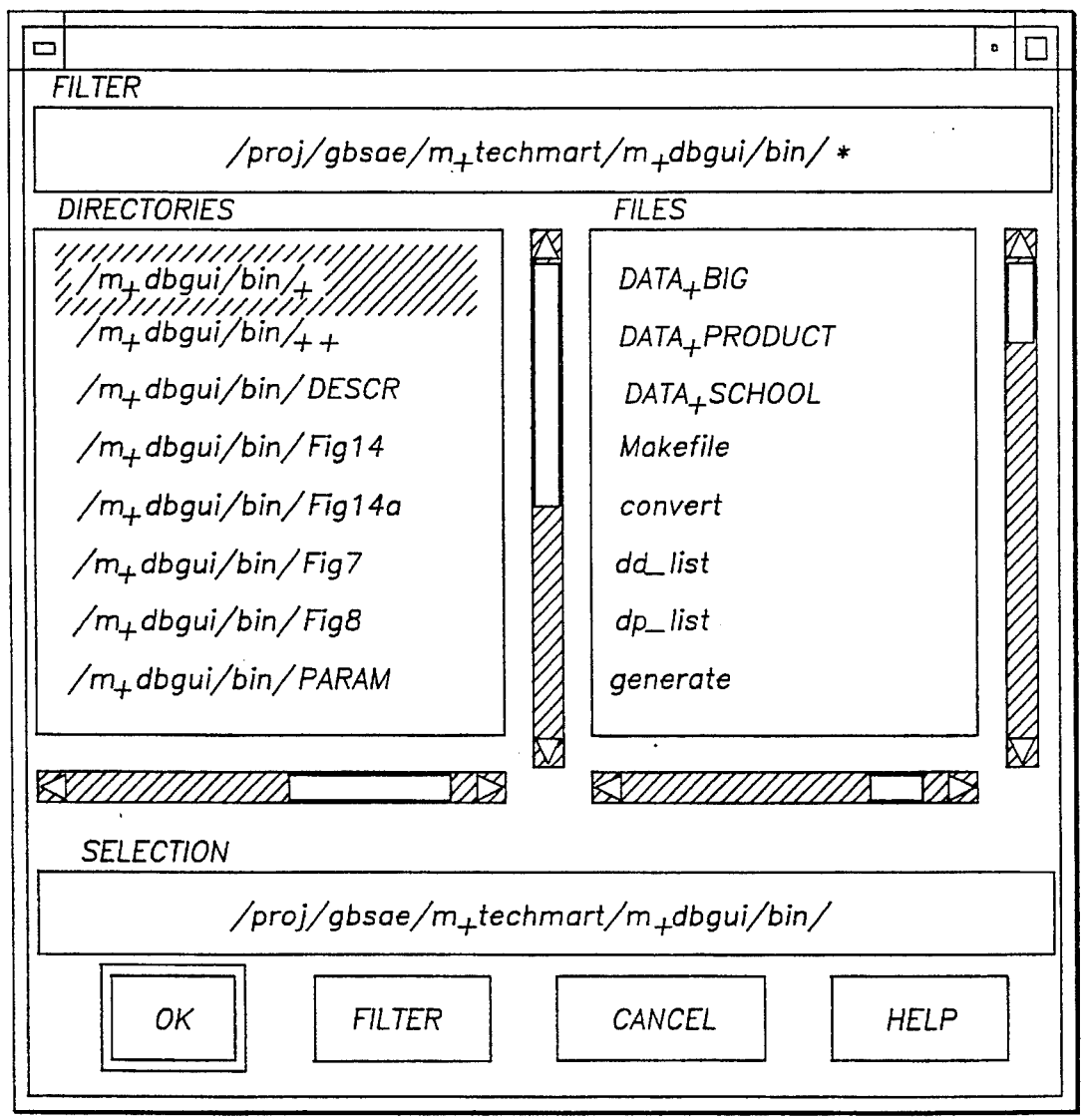
FIG.—9

FIG.—15

```
/*REPRESENTATION SECTION */
OBJECT:NAME;      WIDGET:TEXT;
OBJECT:AGE;       WIDGET:TEXT;
OBJECT:STREET;    WIDGET:TEXT;
OBJECT:CITY;      WIDGET:TEXT;
OBJECT:ZIP;       WIDGET:TEXT;
OBJECT:COMMAND;   WIDGET:LONG TEXT;
OBJECT:PHOTO;     WIDGET:IMAGE BUTTON;
```

```
/*LOCAL ATTRIBUTES */
FONT SIZE = 12;
FONT SIZE = PLAIN;
UPPER MARGIN = 12;
LOWER MARGIN = 12;
LEFT MARGIN = 10;
RIGHT MARGIN = 10;
FIELD SEPARATION = 2;
FIELD LABEL SEPARATION = 4;
```

```
/*LAYOUT PLAN */
LAYOUT USING COLUMN_SPLIT((1,2,3,))
```

*FIG.—17A*

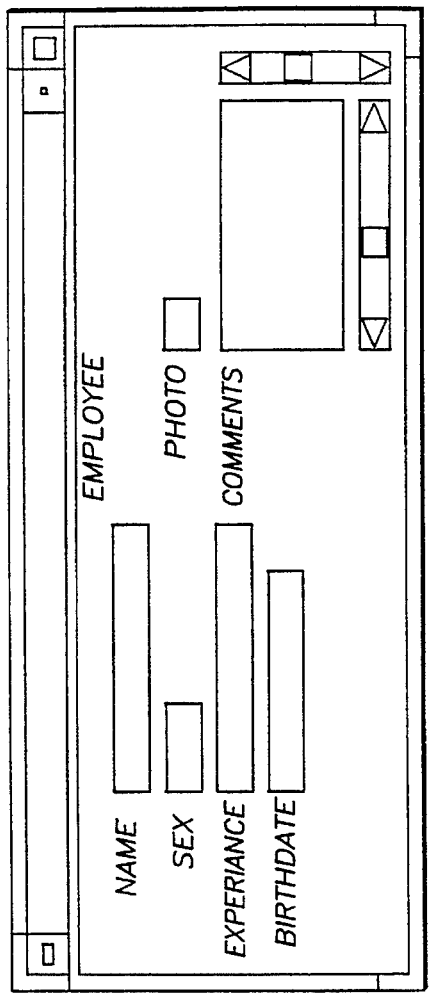

*FIG.—17C*

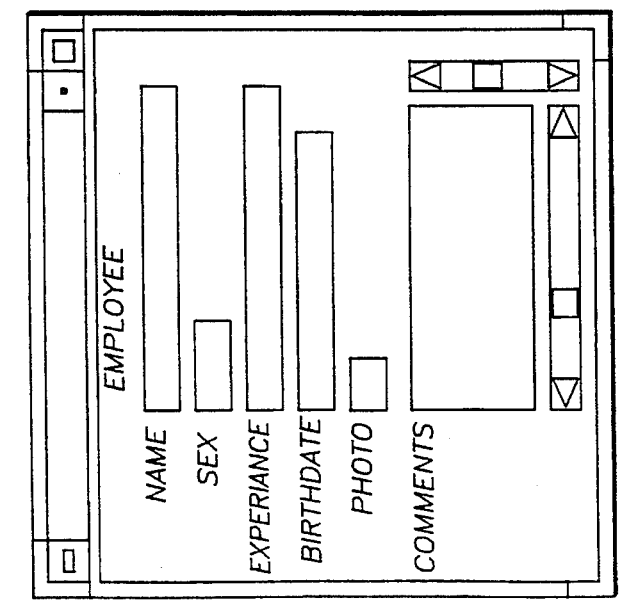

*FIG.—17B*

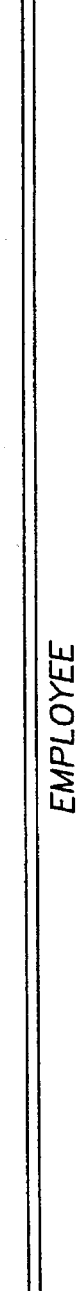
FIG.—17D
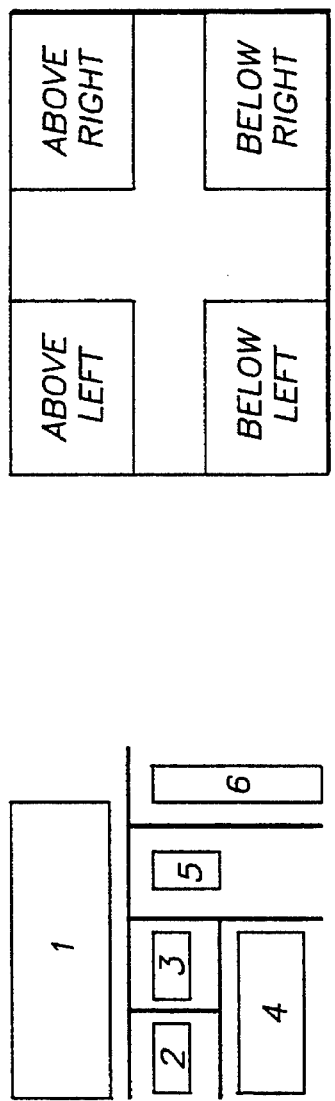
FIG.—18C
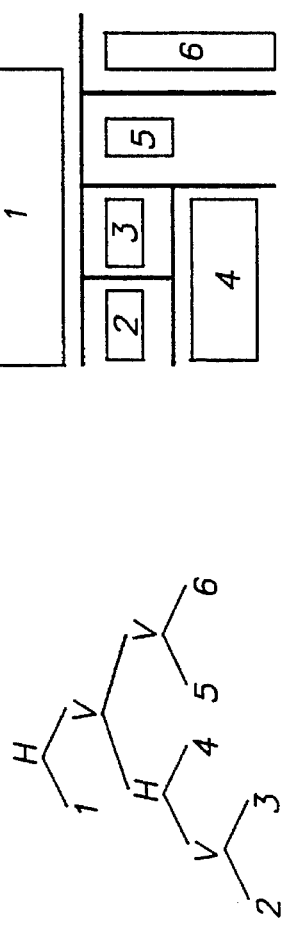
FIG.—18B
FIG.—18A

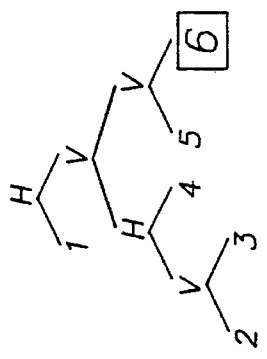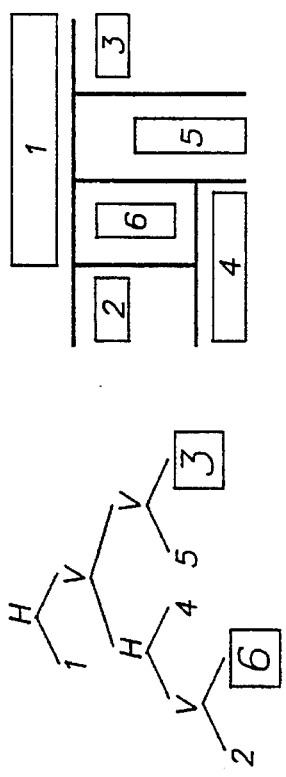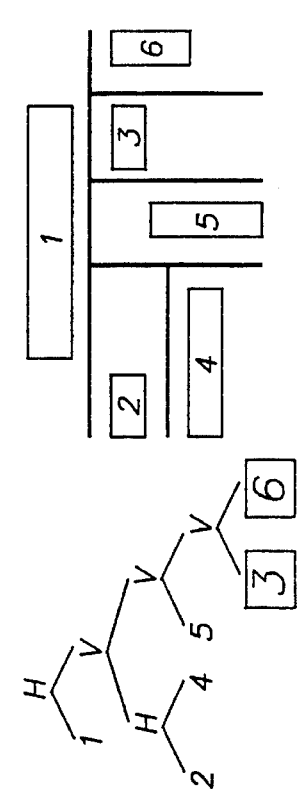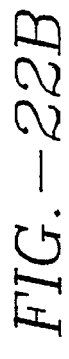
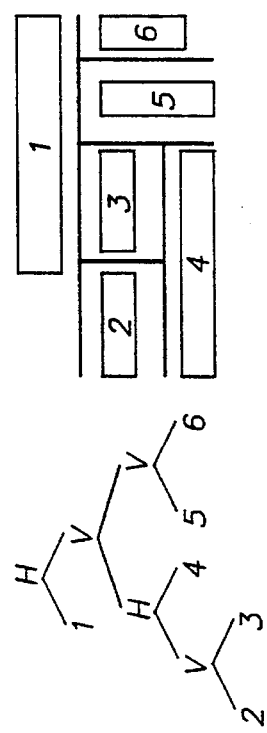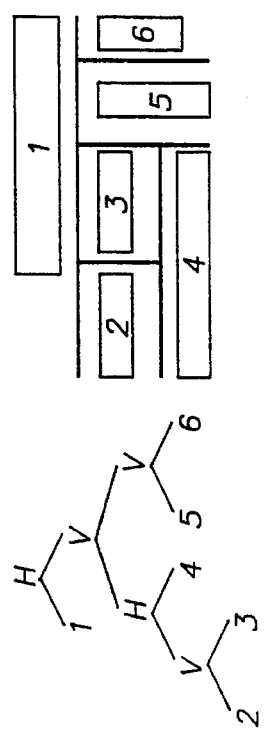

AUTOMATIC INTERFACE LAYOUT GENERATOR FOR DATABASE SYSTEMS

This is a continuation-in-part of application Ser. No. 07/973,057, filed Nov. 6, 1992, U.S. Pat. No. 5,353,401.

The present invention relates generally to layout planning systems for interface displays, and particularly to automatic methods and systems for generating user interface layouts.

BACKGROUND OF THE INVENTION

As is well known, computer programs have become easier to use as a consequence of the development of graphical user interfaces. The proliferation in the number of applications programs with graphical user interfaces is partly the result of the advent of windowed user environments (e.g., Microsoft Windows). Unfortunately, the creation of a graphical user interface generally requires the utilization of user interface "toolkits" by highly-skilled programmers. While user interface toolkits enable a programmer to specify the manner in which a particular data structure is displayed, such toolkits do not address the task of designing the entire interface. Instead, design of the overall interface generally requires an application programmer to:

(1) become knowledgeable about the toolkit and its virtual devices, e.g., text fields, scrolled text windows, push buttons, pull-down menus and the like.

(2) select appropriate virtual devices based on the input and output requirements of the application, (3) customize the devices for the particular application, (4) lay out the selected devices on the interface display, and (5) write code which initiates the interface and integrate it with the application.

Although this creates an interface for an existing application, changing the application typically requires corresponding changes to be made to the interface. It follows that parallel development of an application and its interface requires repeated and costly revisions. Hence, increased interest has developed in the development of tools to automate the design of graphical user interfaces.

In the field of database applications there exist several types of tools used to facilitate the design of user interfaces. Among these are included stand-alone form managers, fourth generation languages, graphical user interface builders, automatic graphical user interface generation systems, and automatic layout designers. -In addition, application specification languages and visual tools based on what has become known as the "EntityRelationship" model are also used in the development of user interfaces.

Stand-Alone Form Managers

Commercially available stand-alone form managers (e.g., INGRES/QBF by Ask Computer Systems Inc., INFORMIX/PERFORM by INFORMIX Software Inc., and ORACLE/SQL*FORMS by ORACLE Corp.) enable the generation of complete database applications with a minimum programming effort. Developers design the layout of the application screens with a graphics editor, then link the fields in the display with their database counterparts using an interactive mechanism or a simple script language. This mode of interaction grants the user access to the database through screen layouts resembling business forms. Although form managers shorten development through automatic generation of database calls, these were originally intended to be used in devices with limited graphical capabilities (e.g., ASCII terminals). Hence, form managers are incapable of taking advantage of graphical user environments; A further disadvantage of stand-alone form generators is that the creation of sophisticated applications typically requires the use of script languages, which are often unfamiliar to inexperienced users. Moreover, stand-alone form generators require the application developer to customize the interface for each application and for each environment in which it is to run.

Fourth Generation Languages

Fourth generation languages combine the screen layout facilities of a form manager with a programming language that supports database calls, controls the interaction between the user and the application interface, and allows general purpose computations. Fourth generation languages (e.g., INGRES/4GL by Ask Computer Systems Inc., and INFORMIX/4GL by INFORMIX Software Inc.) remove some of the limitations exhibited by stand-alone form managers by enabling applications developers to add specialized code. An editor is still used to design the layout of the interface, but code must be provided to control the flow of data between the interface display, i.e., computer screen, and the database. Fourth generation languages are advantageous in that a portion of the dialog control code is generated automatically, and in that modification may be made to the layout of the interface without rewriting code.

Like stand-alone form managers, fourth generation language systems lack graphical interface capability except when combined with graphical user interface builder routines. Moreover, fourth generation languages generally require that more detailed programming be performed than with stand-alone form managers.

Graphical User Interface (GUI) Builders

A series of user interface management systems (UIMS) and interactive design tools (IDTs) have recently been developed. These development aids, commonly referred to as graphical user interface (GUI) Builders, can be used in conjunction with fourth generation languages to produce application programs having relatively sophisticated user interfaces. GUI Builders allow for more flexibility in interface design than do form managers, since users may interact with the database in a manner not dictated by the style of a typical business form.

GUI Builders generally include several visual design tools, including a What-You-See-Is-What-You-Get (WYSIWYG) Editor, which enable:

(1) interactive selection and placement of the graphical objects (defined by blocks of code known as "widgets") comprising the interface, and (2) assignment of values to various attributes, e.g., size, color and font type, of each graphical object. In addition, UIMS also allow for the selection of callback functions, the attachment of user-defined code, and the generation of code used to realize the interface screen display. Unfortunately, the format of interfaces designed using GUI Builders depends exclusively upon knowledge possessed by the application developer. That is, information relating to desirable design practice is not embedded within GUI Builders. It follows that the quality and consistency of interface layouts produced using GUI Builders will vary considerably.

Intelligent GUI Generation Systems

Recent research has yielded several systems capable of automatically generating application programs having graphical user interfaces. These systems use high-level descriptions of the behavior and appearance of data objects included within the application program to produce either an executable program, or source code which is to be edited and refined by the developer prior to generation of the program.

Since the intelligent GUI systems listed above have been developed for general-purpose applications, such systems tend to be incapable of utilizing information specific to particular applications. For example, in database applications such information would include parameters stored within a database dictionary. As a consequence, the code produced by automatic GUI systems generally must be edited so as to be in conformance with the requirements of specific applications. Alternatively, a detailed specification of the database structure could be provided to the automatic system.

Automatic Layout Generators

These systems employ heuristics and rule-based methodologies from expert systems in order to determine an appropriate arrangement for the group of objects represented in the interface. Automatic layout generators are used to automate the portion of the interface design process associated with positioning each interface object, but are generally not utilized in other aspects of interface design. One example of this type of system is disclosed in U.S. Pat. No. 4,700,317 entitled AUTOMATIC LAYOUT PLANNER AND METHOD FOR AUTOMATICALLY CREATING A LAYOUT PLAN, issued Oct. 13, 1987.

Application Specification Languages

Application specification languages allow an application and its interface to be represented using high-level descriptions. These languages enable utilization of a higher level of abstraction than is possible using standard programming languages, e.g., C or C++. This shortens programming time, and tends to reduce the occurrence of errors arising when application developers are forced to keep track of an excessive number of details relating to the application. Unfortunately, however, existing application specification languages have typically been tailored to address the needs of general-purpose applications rather than to specific applications such as, for example, those relating to databases. Accordingly, existing application specification languages have been incapable of efficiently utilizing the information available in the data dictionaries of database applications.

Visual Tools Based on the Entity-Relationship (ER) Approach

ER diagrams are commonly used by application developers as visual tools for modeling data. However, because of limitations in the graphical capabilities of computers in existence at the time that data modeling based on ER diagrams was conceived, it has only recently become possible to fully realize the potential utility of ER diagrams. In this regard numerous commercial data modelers and computer aided software engineering tools based on the ER model or one of its many variations have recently been developed. These systems can be used to create and manipulate graphical representations of a database schema, in some instances producing the textual descriptions needed to create or to modify the database.

ER diagrams have also been utilized within the visual query language field, where graphics are employed in the provision of user requests to the system. Specifically, ER diagrams enable graphical description of the data of interest, but enable results to be presented in only a fixed, predetermined form.

OBJECTS OF THE INVENTION

It is an object of the present invention to provide an interface layout generator capable of producing interfaces, particularly interfaces for database applications, in a manner requiring minimal user specification and operation.

It is a further object of the present invention to integrate information stored within a database dictionary with expert knowledge relating to user interface design into predefined design criteria utilized during generation of such interfaces.

SUMMARY OF THE INVENTION

In summary, the present invention is an automatic interface layout generator for database systems operative to simplify the process of creating graphical user interfaces by performing tasks (e.g., screen layout design and virtual device selection) in the absence of human intervention. The automatic generator includes a specification tool for specifying a set of block descriptions representative of specified portions of a database. A block layout generator produces interface objects to be included within a database interface, wherein each of the interface objects corresponds to one of the block descriptions and includes a plurality of layout fields. A layout quality parameter is determined for each of the interface objects based on arrangement of the layout fields within the interface objects. A block placement generator arranges sets of the interface objects into block configurations within the interface. A placement quality parameter for each of the block configurations is derived based on a set of block placement rules and on the layout quality parameters, and a final block configuration is selected by comparing the placement quality parameters corresponding to particular block configurations.

In a preferred implementation the specification tool operates to identify a set of objects of interest in an ER diagram. This specification operation may be considered akin to defining a view of the database. In particular, the specification tool transforms the objects of interest in the ER diagram into statements descriptive of application components suitable for immediate use by a screen generator.

BRIEF DESCRIPTION OF THE DRAWINGS

Additional objects and features of the invention will be more readily apparent from the following detailed description and appended claims when taken in conjunction with the drawings, in which:

FIG. 3B depicts the screen layout of a typical database application.

FIG. 4B shows one example of a data structure in the form of an Operations Table which may be employed to represent the status of the operations panel.

FIG. 6 depicts an interface in which multiple occurrences of the entities ITEM and ORDER are shown simultaneously.

FIG. 7 represents an interface in which relationships between the multiple displayed entities must be inferred by the user of the interface.

FIGS. 8A–8C illustratively represent pull-down menus associated with the 'File,' 'Edit,' and 'Schema' commands available to an interface designer in an exemplary embodiment.

FIG. 9 depicts a graphics window used to prompt an interface designer for the name of a database for which an interface is to be generated.

FIG. 10 illustratively represents a pull-down menu associated with the 'Interpret' command available to an interface designer in an exemplary embodiment.

FIG. 17A shows an example of a template which, together with a block description file, are utilized by the block layout generator to produce a set of three object blocks depicted in FIGS. 17B–17D.

FIG. 18A is a sliced tree representation of a set of object blocks included within a block configuration shown in FIG. 18B.

FIG. 18C shows an initial block placement corresponding to the sliced tree representation of the initial placement depicted in FIG. 18B.

FIGS. 20A and 20B depict changes occurring to a block configuration as a consequence of execution of a Replace operation performed during a simulated annealing block placement procedure.

FIGS. 21A and 21B depict the effects on a block configuration resulting from a Swap operation.

FIGS. 22A and 22B depict the effects on a block configuration due to a Move operation.

DESCRIPTION OF THE PREFERRED EMBODIMENT

Introduction

Figure 1A:
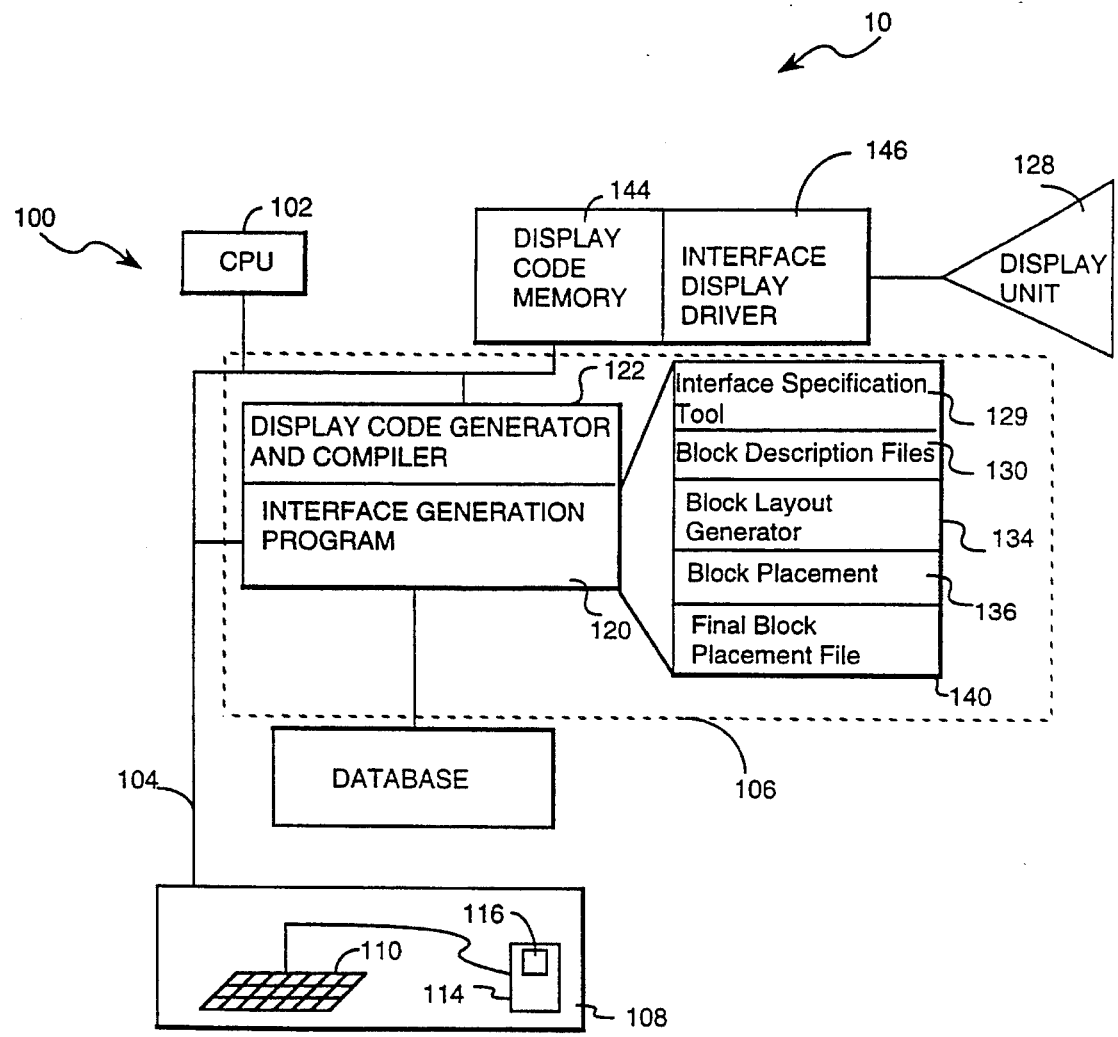
FIG. 1A is a block diagram of a preferred embodiment of the inventive automatic interface layout generator for database systems.

Referring to FIG. 1A, there is shown a block diagram of a preferred embodiment of the inventive automatic interface layout generator 10 for database systems. The automatic layout generator 10 of the present invention includes a general purpose computer system 100 having a central processing unit 102 that is interconnected by a system bus 104 to primary memory 106 (i.e., high speed, random access memory), to secondary memory 107, and to one or more input units 108. Each input unit 108 typically includes a keyboard 110, and a mouse pointer device 114 with item selection button 116. Stored in primary memory 106 are an interface generation program 120, as well as a display code generator and compiler 122. As is described hereinafter, the interface generation program 120 is operative to automatically design a user interface for a database stored in secondary memory 104 when appropriate instructions are received from a user via input unit 108. In particular, a diagram representative of the database resident in memory 104 is initially displayed on a display unit 128 using information included within the dictionary of the database and standard graphic layout techniques. An interface specification software tool 129 allows the user, i.e., the interface designer, to select portions of the database structure of interest. This selection is accomplished through a series of point and click operations using pointer device 114 in which the user removes from the database diagram those entities, entity attributes and entity relationships not intended to be represented within the user interface. An interpreter module (not shown) creates a block description file 130 for each entity and relationship included within the database structure selected using the interface specification tool 129.

As employed hereinafter, the term "entity" refers to an object recognizable by the user of an application program (e.g., an object, location or the like) which is described by information stored within an application database. An "attribute" refers to a particular characteristic of an entity (e.g. color, shape, distance), and are represented in the database by attribute values. This allows a specific "entity occurrence", or simply "occurrence", to be defined by the set of information resulting from selection of an attribute value for each attribute associated with the entity. Finally, a "relationship" represents an association between two or more entities.

Figures 1, 4A:
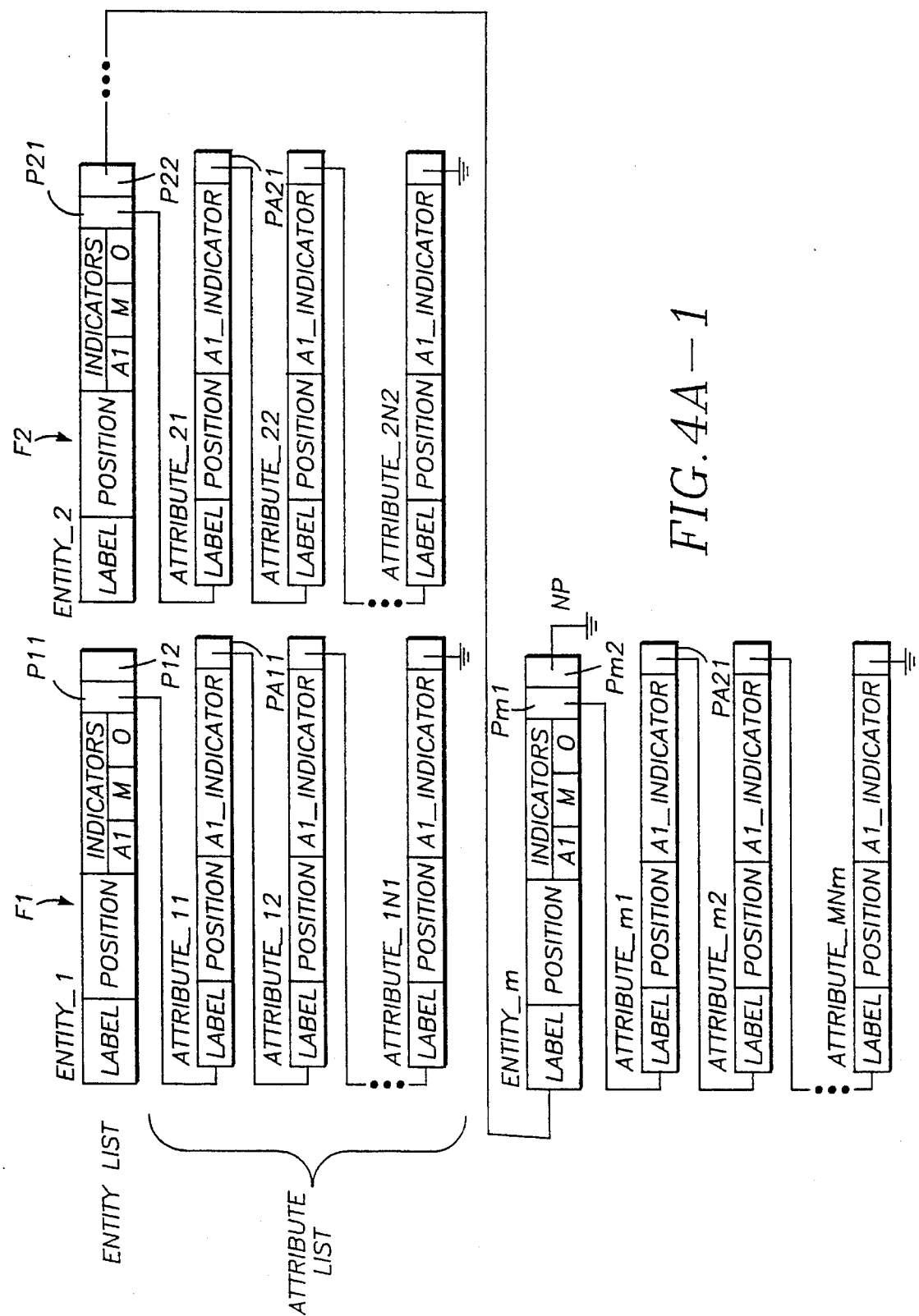
FIG. 4A provides a generalized representation of a data structure within a primary memory representative of the database schema of FIGS. 2 and 3.

Again referring to FIG. 1A, the interface generation program 120 includes a block layout generator 134 for synthesizing a set of graphical object blocks of varying geometry for each of the entities defined within the block description files 130. A block placement routine 136 is used to determine a preferred placement of object blocks within the user interface in accordance with a combinatorial optimization routine. In this routine the quality of the user interface resulting from various combinations of object blocks is evaluated based on predefined criteria, wherein each combination includes one object block corresponding to each block description file 130. The block combination of highest quality is stored within a final block placement file 140. Referring to FIG. 1, code generator 122 then generates display code based on the user interface design defined by the final block placement file 140. This code is stored in display code memory 144, and is accessed by an interface display driver 146 during display of the user interface via display unit 128.

Detailed Description

As mentioned above, the interface specification tool 129 enables the interface designer to specify which portions of a database stored in secondary memory 104 are to be represented in the user interface created by the interface generation program 120. An application is typically characterized by specifying:

(1) a list of the entities, relationships and attributes of interest; and, (2) a set of indicators describing the number of occurrences to be displayed for each entity.

Figure 1B:
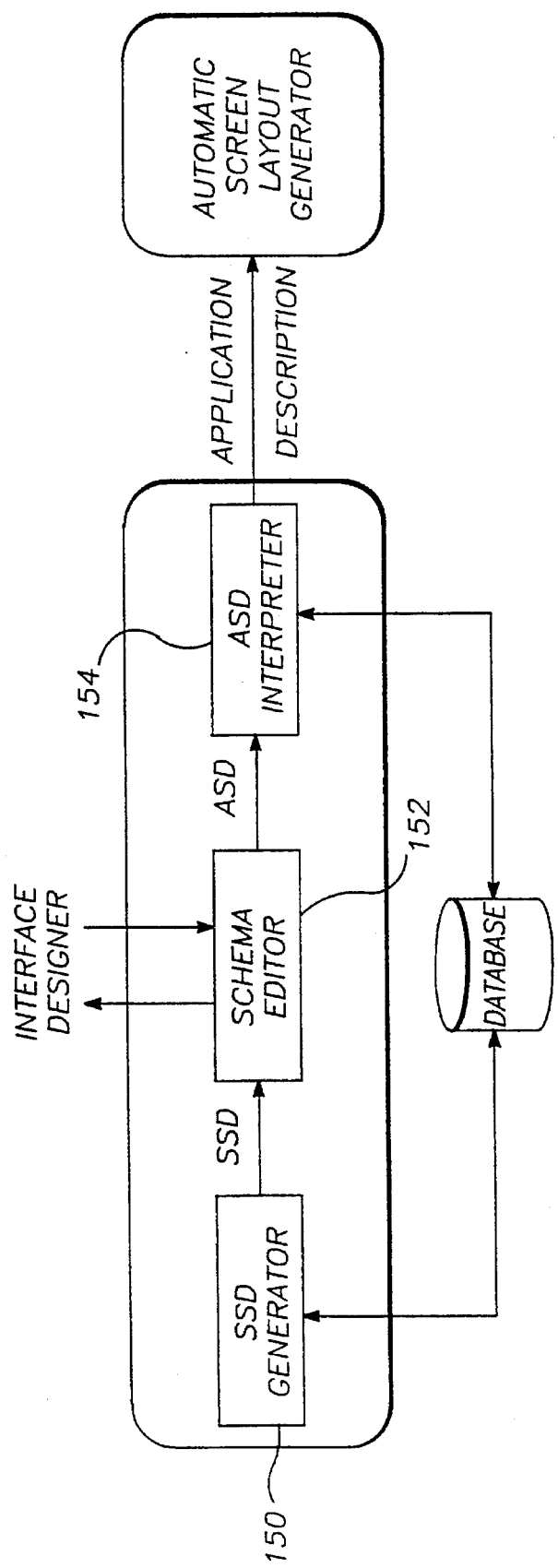
FIG. 1B is a more detailed representation of an interface specification tool included within the automatic layout generator of FIG. 1A.

Referring to FIG. 1B, there is shown a more detailed representation of the interface specification tool 129. The interface specification tool 129 is an interactive mechanism which provides an interpreter module with the information necessary to synthesize the block description files 130. This is done through a series of operators that enable the systematic transformation of a schematic representation of a semantic database schema diagram (SSD) into a second type of representation, termed an application specification diagram (ASD), defining the entities and relationships of interest.

The following description of the interface specification tool 129 is intended to describe one manner in which a database structure for which an interface is to be generated may be specified. At the conclusion of this database specification process the block description files 130 are created by the interpreter. It is understood, however, that such block description files may be created by the direct entry of information relating to the structure of the portion of a database for which an interface is to be designed.

In a preferred implementation the interface specification tool 129 is coded in a standard programming language (e.g., C or C++) and includes the following components: (i) a database schema (SSD) generator 150, (ii) a schema editor 152, and (iii) an application specification diagram (ASD) interpreter 154.

Figure 2:
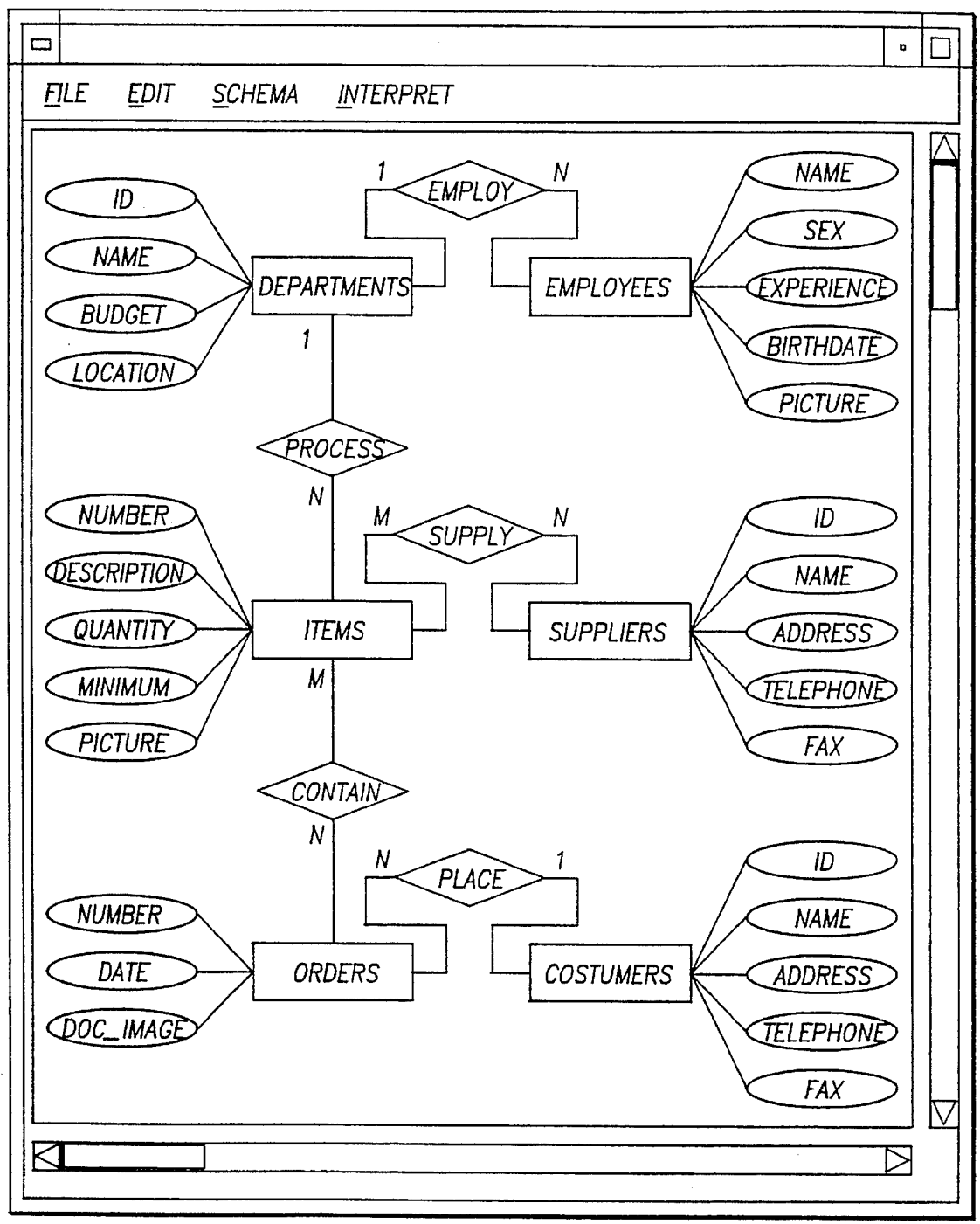
FIG. 2 depicts an example of a display of a database schema.

As noted above, one way in which a given database schema (SSD) may be graphically represented is in terms of an ER diagram. FIG. 2 depicts one manner in which an SSD representative of a database relating to the organization of a company could be displayed via an ER diagram. The SSD generator 150 extracts information about the structure of the database from the database dictionary and converts it into an ER diagram. The SSD generator 150 includes an SSD layout generator 156 which determines the position of each entity, relationship and attribute in the ER diagram. The ER diagram of FIG. 2 allows the interface designer to select objects representative of entities of interest (e.g., EMPLOYEES, DEPARTMENTS, ITEMS, SUPPLIERS, ORDERS and CUSTOMERS).

Figure 3A:
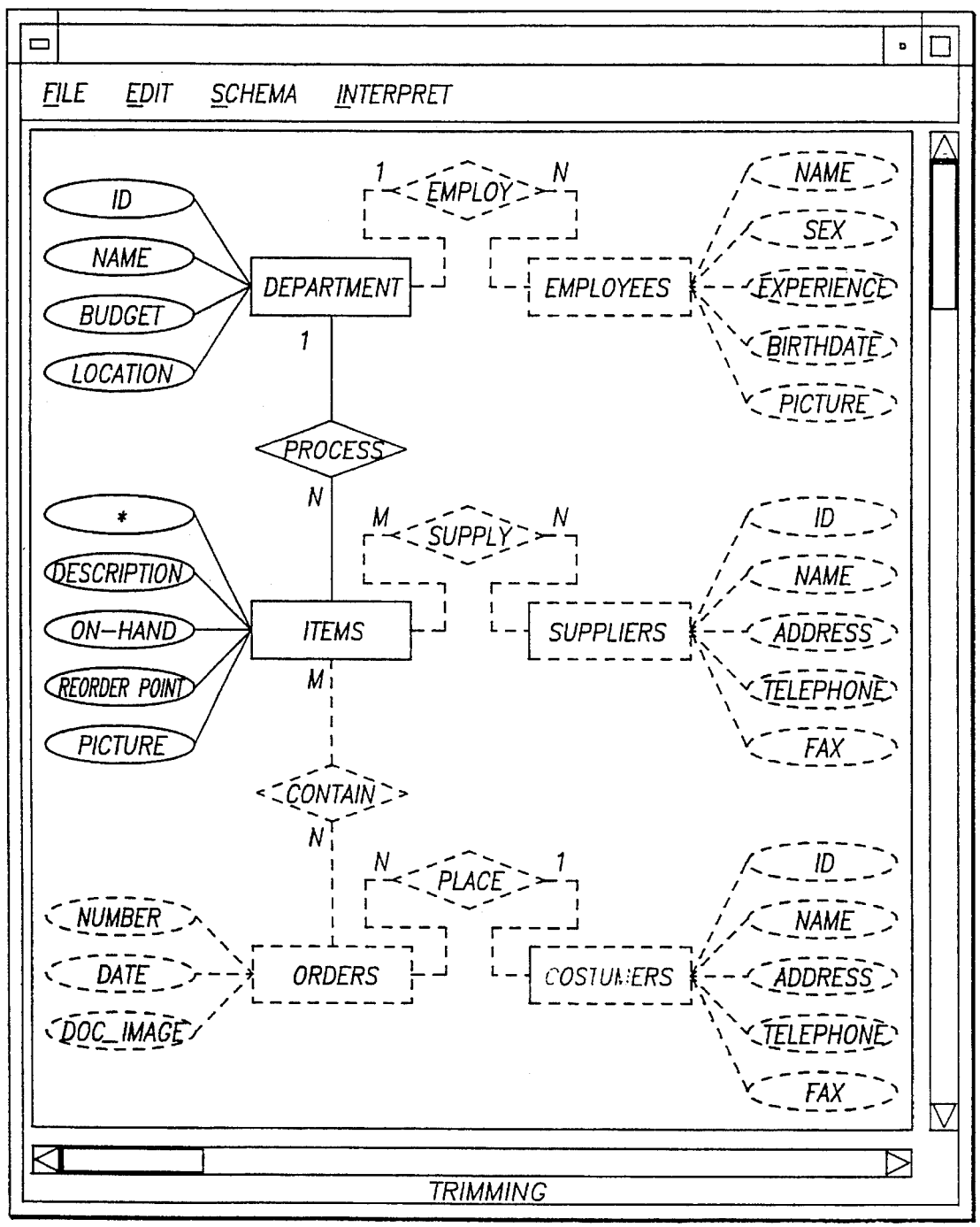
FIG. 3A depicts an application specification diagram produced by editing the schema shown in FIG. 2 using a schema editor.

The schema editor 152 is used by application developers to transform an SSD of the database, as represented by an ER diagram, into an application specification diagram (ASD) such as is shown in FIG. 3A. In effecting this transformation four operations are performed by the schema editor: (1) specification of occurrence indicators, (2) diagram trimming, (3) diagram labeling, and (4) definition of master-slave relationships. With regard to operation (1), entities may be further categorized as either single-occurrence (S) or multiple-occurrence (M) entities. When defined in a given ASD as a single-occurrence entity, a single occurrence of the entity would appear in the interface generated on the basis of the given ASD. Similarly, multiple occurrences of entities specified within an ASD as being of the multiple-occurrence type would be made to appear within interfaces derived from the particular ASD. As is described hereinafter, the present invention provides a method for generating a graphical user interface (GUI) exemplified by, for example, the screen layout of FIG. 3B, on the basis of an ASD such as depicted in FIG. 3A.

FIG. 4A provides a generalized representation of a data structure within primary memory 106 representative of the database schema of FIGS. 2 and 3A. As shown in FIG. 4A, information pertaining to a plurality of entities, i.e., Entity__1, Entity__2, . . . , Entity__m, is stored in an Entity List. Specifically, stored within a data field F1 corresponding to Entity__1 are the following values: (1) a string (Label) indicative of the name of the entity; (2) a pair of integers (Position) specifying the (x,y) coordinates in the display where the entity is to be shown; and (3) three indicator values (Al, M, O) used by the schema editor 152 and interpreter 154 to keep track of the entity status during the specification process. Also included in field F1 is numerical pointer P11 corresponding to the memory location of the field associated with the first attribute, i.e., Attribute__11, of Entity__1. Similarly, the value of numerical pointer P12 indicates the location of data field F2 associated with Entity__2. A null pointer NP indicates the end of the Entity List.

An Attribute List includes sets of data fields corresponding to the attributes of each entity within the Entity List. For example, if Entity__1 corresponds to the DEPARTMENT entity within the database schema of FIG. 2, then Attribute__11 would refer to Id, Attribute__12 to Name, and so on. Each entry in the attribute list possesses values for the text associated with the attribute name (Label) and its position in the display (Position). A single indicator value (Al) is used by the schema editor 152 and interpreter 154 to keep track of the attribute status during the specification process. The value of the pointer PA 11 included within the field of Attribute__11 is indicative of the memory location of Attribute__12. As shown in FIG. 4A, a Relationship List includes a plurality of linked data fields defining the relationship between entities displayed via the schema editor. As in the case of entities, each relationship may have associated therewith a set of attributes defined within a Relationship Attribute List. If the database schema of FIG. 2 is used as an example, the data field Relationship__1 could be used to define the "supply" relationship between ITEMS and SUPPLIER. The Label, Position and Al values within Relationship__1 specify the position and status of the "supply" text within FIG. 2, while the Cardinality value of M:N indicates the ratio of the number entries within ITEMS and SUPPLIERS.

The schema editor facilitates selection of the entity relationships depicted in FIG. 3A by modifying the entries within the data structure of FIG. 4A on the basis of information provided by the interface designer. For example, assume that in FIG. 2 that the entity EMPLOYEES corresponds to Entity__2 (FIG. 4A). Upon deletion of the Birthdate attribute associated with EMPLOYEES (FIG. 2) using a point and click operation, the schema editor would change the value of the pointer PA21 of Attribute__21 so as to reflect the memory location of Attribute__23.

The interface specification tool 129 will also preferably include an operations panel in which graphical icons in the form of "buttons" or the like representative of common database operations are made available to the interface designer during the database specification process. Included among these common operations are RETRIEVE, UPDATE, INSERT, DELETE, PREVIOUS, NEXT, and EXIT. The icons representative of these operations can be toggled by the interface designer using a series of point and click operations in order to select/de-select particular operations. FIG. 4B shows one example of a data structure in the form of an Operations Table which may be employed to represent the status of the operations panel. The specification tool 129 considers all operations to be selected by default, and imposes the following constraints upon the chosen set of operations:

(1) EXIT cannot be de-selected, (2) if DELETE is selected, then RETRIEVE must also be selected, and (3) if UPDATE is selected, then RETRIEVE must also be selected.

Figure 5A:
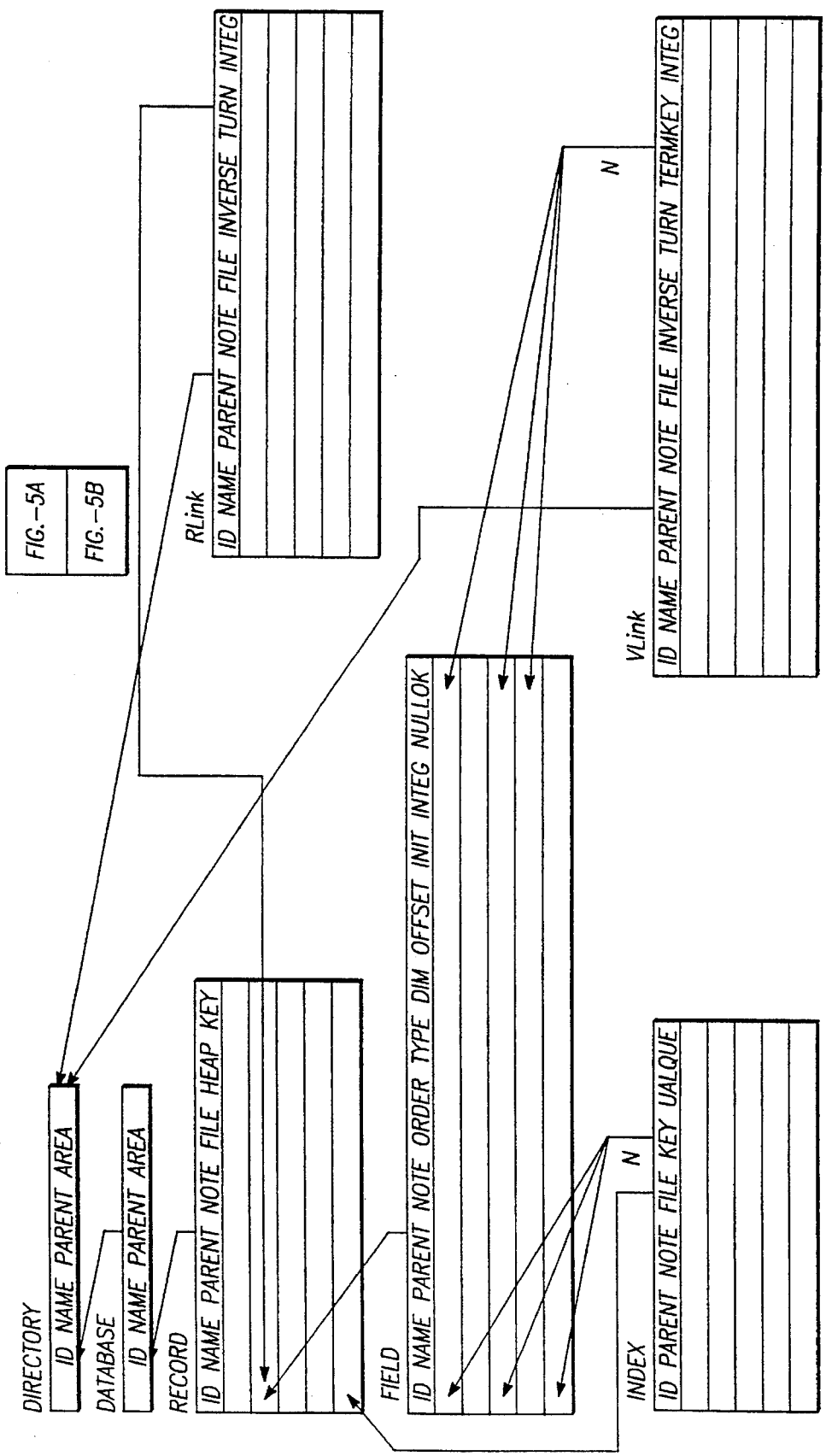
FIG. 5 represents a database dictionary with which are associated the entries within the Operations Table of FIG. 4B.
Figure 5B:
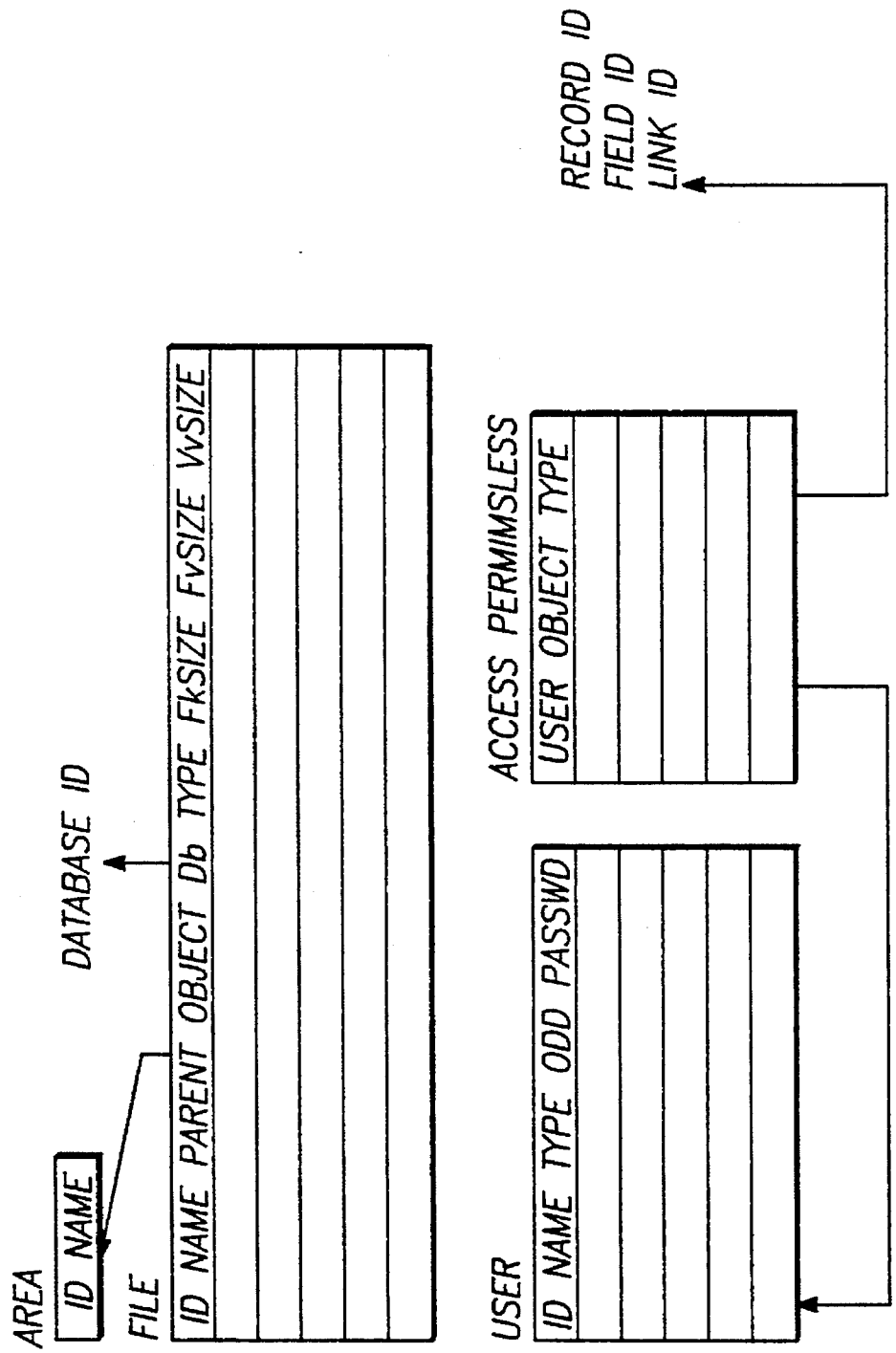

As is described hereinafter, the application specification tool and the layout generator of the invention utilize information stored within the dictionary of a selected database used to create the block description files (BDFs) 130. The manner in which the BDFs are synthesized may be more readily explained by making reference to the structure of such a database dictionary. Accordingly, FIG. 5 illustratively represents the structure of a typical database dictionary. An explanation of each of the records included within the dictionary of FIG. 5 is set forth below:

Directory

One record is created for each directory.

| Id | Directory number |
|---|---|
| Name | Directory name |
| Parent | Parent directory number |
| Area | Default value for the area number of the UNIX directory under which files related to the database are created. |
| Primary key | (Id) |
| Secondary key | (Parent, Name) |

Database

One record is created for each database.

| Id | Database number |
|---|---|
| Name | Database name |
| Parent | Parent directory number |
| Note | Comments |
| Area | Default value for area in which files related to this database are created. |
| Primary key | (Id) |
| Secondary key | (Parent, Name) |

Record

One record is created for each record type.

| Id | Record type number |
|---|---|
| Name | Record type name |
| Parent | Database number |
| Note | Comments |
| File | Record file number |
| Heap | Heap file number |
| Key | Array of field numbers comprising primary key |
| Primary key | (Id) |
| Secondary key | (Parent, Name) |

Field

One record is created for each field.

| Id | Field number |
|---|---|
| Name | Field name |
| Parent | Record type number |
| Note | Comments |
| Order | The logical field number within the record |
| Type | Encoded data type |
| Dim | Number of elements in array |
| Offset | Field position within record |
| Init | Test representation of initial value |
| Integ | Integrity information |
| NullOk | Allows or disallows null values. |
| Primary key | (Id) |
| Secondary keys (Parent, Offset) | (Parent, Name) |

Index

One record is created for each index.

| Id | Index number |
|---|---|
| Parent | Record type number |
| Note | Comments |
| File | Index file number |
| Key | Array of field numbers comprising keys |
| Unique | Allows or disallows duplicates. |
| Primary key | (Id) |
| Secondary keys (Key) | (Parent) |

RLink

One record is created for each real-link type.

| Id | Real-link type number |
|---|---|
| Name | Link name (null value for unnamed inverse link types) |
| Parent | Database number |
| Note | Comments |
| File | Real-link file number |
| Inverse | Inverse link type number |
| Term | Terminal record type number |
| Integ | Integrity information |
| Primary key | (Id) |
| Secondary keys (Term) (Inverse) | (Parent, Name) |

VLink

One record is created for each virtual-link type.

| Id | Virtual-link type number |
|---|---|
| Name | Link name (null value for unnamed inverse link types) |
| Parent | Database number |
| Note | Comments |
| Inverse | Inverse link type number |
| Term | Terminal record type number |
| Termkey | Array of field numbers comprising key of terminal table |

-continued

| Integ | Integrity information |
|---|---|
| Primary key | (Id) |
| Secondary keys | (Parent, Name) |
| (Term) | |
| (Inverse) | |

Area

One record is created for each area in which files are created.

| Id | Area number |
|---|---|
| Name | Absolute pathname within UNIX filesystem |
| Primary key | (Id) |
| Secondary key | (Name) |

File

One record is created for each file.

| Id | File number |
|---|---|
| Name | Logical name of file (does not match UNIX file name) |
| Parent | ID number of the area in which file is stored |
| Object | ID number of the record type, index or real-link type this file defines |
| Db | Database number |
| Type | Classification as sequential file or B-tree, and as fixed length or variable length |
| FkSize | Number of bytes in fixed-length key section |
| VkSize | Number of bytes in variable-length key section |
| FvSize | Number of bytes in fixed-length data section |
| VvSize | Number of bytes in variable-length data section |
| Primary key | (Id) |
| Secondary keys | (Parent) |
| (Db) | |

User

One record is created for each user.

| Id | User number |
|---|---|
| Name | User name |
| Type | Classification as UNIX user, UNIX group member or as user administered solely by GraphBase using password |
| Osid | UNIX user number of group number |
| Passwd | Encoded password |
| Primary key | (Id) |
| Secondary keys | (Type, Name) |
| (Type, Osid) | |

Access Permissions

One record is created for each permission granted.

| User | User number |
|---|---|
| Object | Access object number |
| Type | Type of access indicated using bit pattern |
| Primary key | (User, Object) |
| Secondary key | (Object, User) |

Statistics

One record is created for each access object.

| Object | Access object number |
|---|---|
| Ctime | Date and time that data definition was first made for access object. |
| Mtime | Date and time that data definition was last made for access object. |
| Account | Array containing number of times processing was carried out for each access type. |
| Primary key | (Object) |

The database dictionary of FIG. 5 includes the following virtual links between the indicated records to facilitate queries made by the interpreter module during generation of the block description files 130:

DirectoryDirectory Sub-directories belonging to directory
DirectoryDatabase Sub-databases belonging to directory
DatabaseRecord Record types belonging to database
RecordField Record fields belonging to record type
RecordIndex Indexes belonging to record type
DatabaseRLink Real link types belonging to database
DatabaseVLink Virtual link types belonging to database
RecordRLink Real links connected to record type
RecordVLink Virtual links connected to record type
RLinkRLink Inverse link type corresponding to real-link type
VLinkVLink Inverse link type corresponding to virtual-link type
RecordFile Record file corresponding to record type
IndexFile Index file corresponding to index
RLinkFile Link file corresponding to real-link type
AreaFile Files belonging to file area
UserAccessRight Access rights belonging to user
Directory AccessRight Access rights to directory
DatabaseAccessRight Access rights to database
RecordAccessRight Access rights to record type
FieldAccessRight Access rights to field
RLinkAccessRight Access rights to real-link type
DirectoryStatistics Statistical information pertaining to directory
DatabaseStatistics Statistical information pertaining to database
Record Statistics Statistical information pertaining to record type
FieldStatistics Statistical information pertaining to field
IndexStatistics Statistical information pertaining to index
RLinkStatistics Statistical information pertaining to real-link type
VLinkStatistics Statistical information pertaining to virtual-link type
AreaStatistics Statistical information pertaining to file area
FileStatistics Statistical information pertaining to file
UserStatistics Statistical information pertaining to users.

The entries within the structure of FIG. 4A are associated with the database dictionary represented in FIG. 5 as set forth below:

(i) entities are associated with the Record table of FIG. 5;
(ii) relationships are associated with Rlink and Vlink tables of FIG. 5; and
(iii) attributes are associated with Field table of FIG. 5.

In an exemplary embodiment the data structure of FIG. 4A is constructed based on the foregoing associations in accordance with the following procedure. Specifically, for each entry in the Record table, a node F1 is generated in the entity list (FIG. 4A). The value in the name field of the Record table is then assigned to the label value in the node, and the value (0,0) is assigned to the position value in the node. In addition, the indicators Al, M and O are set to the logical value FALSE. Next, the nodes in the entity list are connected as shown in FIG. 4A.

For each entry in the Field table a node is generated in the attribute list of the corresponding entity (FIG. 4A). The name of the field is assigned to the label of the node, and the values (0,0) and FALSE are respectively assigned to the position value and to the Al indicator. The attribute nodes in each attribute list are then connected as shown in FIG. 4A. For each entry in the Rlink and Vlink tables (FIG. 5) a node is generated in the relationship list. For each node in the relationship list, the label field is filled with the name of the corresponding Wink or Rlink entry. In addition, the values (0,0) and FALSE are respectively assigned to the position value and to the Al indicator, while the cardinality is set to 1:1. The relationship nodes are then connected as shown in FIG. 4A.

The pair of entities related by a particular relationship are identified as an initial entity (initial_entity) and as a terminal entity (terminal_entity). The initial_entity identifier is specified either with the value of Rlink.init or Vlink.init, while the terminal_entity identifier corresponds either to the value of Rlink.term or Vlink.term. After identifying the node in the entity list corresponding to the initial_entity, that node is connected to the corresponding relationship node using a first entity pointer (e.g., Entity_1x in FIG. 4A). The node in the entity list corresponding to the terminal_entity is then linked with the associated relationship node using a second entity pointer (e.g., Entity_1y in FIG. 4A).

The foregoing procedure results in specification of the general structure of the database depicted in FIG. 4A. In what follows there is described an SSD layout procedure designed to allow specification of the position of each entity, relationship and attribute within an SSD (semantic schema diagram) of the database of FIG. 4A. In an exemplary implementation the interface designer performs this process by manually specifying various position values within an SSD layout file. The structure of such an SSD layout file is set forth below:

<database name>

ENTITY SECTION

ENTITY<entity_1>AT<x1><y1>

ENTITY<entity_2>AT<x2><y2>

ENTITY<entity_N>AT<xN><yN>

ATTRIBUTE_SECTION

ATTRIBUTE<attribute_11>OF<entity_1>AT<x11> <y11>

ATTRIBUTE<attribute_12>OF<entity_1>AT<x12> <y12>

ATTRIBUTE<attribute_21>OF<entity_2>AT<x21> <y21 >

ATTRIBUTE<attribute_22>OF<entity_2 >AT<x22> <y22>

ATTRIBUTE<attribute_N1>OF<entity_N>AT<xN1> <yN1 >

ATTRIBUTE<attribute_N2>OF<entity_N>AT<xN2> <yN2>

RELATIONSHIP SECTION

RELATIONSHIP<relationship_1>BETWEEN<entity_1> <entity 1>AT<x1><y1>

Figures 3, 4A:
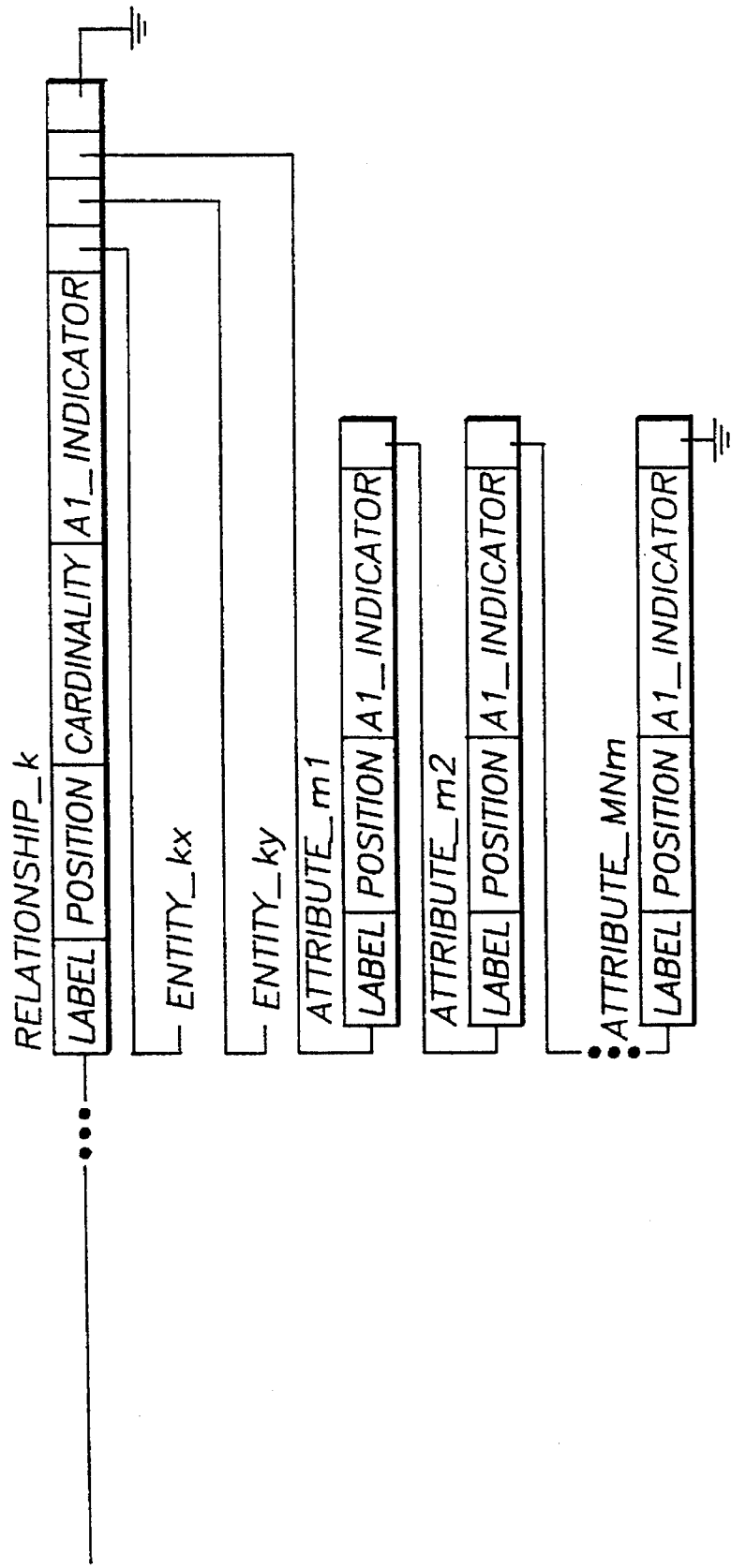

As an example, the following corresponds to selected portions of an SSD layout file used in generating FIGS. 2 and 3:

PRODUCT DATABASE

ENTITY_SECTION

ENTITY Departments AT 150 80

ENTITY Items AT 150 230

ENTITY Orders AT 150 380

ENTITY Employees AT 350 80

ENTITY Suppliers AT 350 230

ENTITY Customers AT 350 380

ATTRIBUTE_SECTION

ATTRIBUTE ID OF Departments AT 50 40

ATTRIBUTE Name OF Departments AT 50 70

ATTRIBUTE Budget OF Departments AT 50 100

ATTRIBUTE Location OF Departments AT 50 130

ATTRIBUTE ID OF Customers AT 480 320

ATTRIBUTE Name of Customers AT 480 350

ATTRIBUTE Address OF Customers AT 480 350

RELATIONSHIP_SECTION

RELATIONSHIP process BETWEEN Departments AND items AT 150 155

RELATIONSHIP Place BETWEEN Orders AND Customers AT 250 230

A screen display of the SSD corresponding to a particular SSD layout file may be generated using a conventional graphics package such as that provided with the OSF/Motif toolkit. In producing the display the nodes of the structure of FIG. 4A are traversed, and an icon descriptive of the object defined at each node is created. In an exemplary embodiment a rectangular icon is created for each entity, an ellipsoidal icon for each attribute, and an icon in the shape of a diamonds for each relationship. Each icon is of predetermined size, and the position of each is specified within the SSD layout file. Finally, lines are displayed between each entity and its associated attributes, as well as between each entity and its associated relationships.

In an exemplary embodiment the commands specified within the menu bar of FIG. 2 are available to an interface designer for execution of various editing operations. The commands offered in the menu bar are organized in four pull-down menus entitled: 'File,' 'Edit,' 'Schema,' and 'Interpreter.'

The following operations are available in the 'File' pull-down menu (FIG. 8A):

New: Prepares the system for the definition of a new application file by clearing the graphics area and initializing the internal data structure in which are stored the SSD and ASD associated with the new interface.

Open: Prompts the user for the name of an existing application file. Each application file is organized in accordance with a database schema structure such as that described below with reference to FIG. 4A.

Save: Copies the current status of the database schema structure to an external file.

Quit: Ends the current application specification session.

The 'Edit' pull-down menu (FIG. 8B) allows the selection of operations used in transforming an SSD into an ASD. Specifically, the operations: 'Trim', 'Replace-Label', 'Select-Master', and 'Set-Occurrences', are capable of being selected from the 'Edit' pull-down menu.

Trim

The 'Trim' operation involves the elimination of objects from a database SSD not relevant to the application for which an interface is being developed. In order to support the trimming operation each entity, relationship and attribute in the application is maintained in either an active state or an inactive state. As an example, the trimming operation as implemented by the schema editor allows the representation of FIG. 2 to be converted to the ASD of FIG. 3A seen by the interface designer. As shown in FIG. 3A, the schema editor 152 has been used to render the entities EMPLOYEE, SUPPLIERS, CUSTOMER and ORDERS inactive and thereby remove them from the database schema of FIG. 2. In addition, certain entity attributes (e.g.,Name of EMPLOYEES) and entity relationships (e.g., "employ" between DEPARTMENT and EMPLOYEE) have been pared from the display of FIG. 2 using the schema editor 152 in order to produce the representation of FIG. 3A. It is observed that the schema editor 152 does not prevent inactive objects from being viewed by the interface designer upon inspection of the ASD, but instead causes active objects to be displayed using solid rectangles and inactive objects to be displayed using dashed rectangles. The status of an object can be toggled between the two states, i.e., active and inactive, through a conventional mouse-click operation or the like.

Upon selection of the 'Trim' operation from the 'Edit' pull-down menu, a trimming mode is entered in which all keyboard strokes are ignored in the preferred embodiment. In the trimming mode inputs from a user pointing device, e.g., a "mouse", are used to specify an object, i.e., an entity, relationship, or attribute, to be trimmed from an SSD during development of a desired ASD. The following sequence of definitions and process steps describe an object-identification procedure by which an object may be identified for trimming:

1) Let (X,Y) denote the display position indicated upon user actuation, i.e., "clicking" of the pointing device.
2) Let $P_i=(x_i,y_i)$ represent the display position of the $i^{th}$ entity ($E_i$) in the entity-list of FIG. 4A.
3) Let W and H respectively define the width and height of the rectangles used in the representation of entities within the ASD.
4) For each entity $E_i$ in the entity list, evaluate the following Boolean condition:

$$C=(x_i-W/2<=X<x_i+W/2) \text{ AND } (y_i-H/2=<Y< y_i+H/2)$$

If C=TRUE then let $O=E_i$ be the object identified and end the procedure.

5) Perform second and third iterations of steps 1–4 for the relationships and attributes specified in FIG. 4A.

In an exemplary embodiment the value of O is NULL if the pointing device is located in an area of the diagram not containing an object of interest, i.e. an entity, relationship or attribute. In such cases the pointing operation performed by the user is ignored. If, however, an object O is successfully identified for trimming then the following steps are performed.

1) Let Al be the active-inactive indicator for the object O.
2) If Al is 'inactive' change it to 'active', and if Al is 'active' change it to 'inactive'.
3) If Al is active use a solid line to redisplay the particular icon (e.g., rectangle, diamond, oval) used to represent the object O. Otherwise redisplay the particular icon using a broken line.

In an exemplary embodiment the trimming operation is implemented by the schema editor in accordance with the following design rules:

(1) all objects, i.e., entities, attributes and relationships, are placed in an active status when a particular SSD is initially selected;
(2) if an entity is made inactive, the attributes and relationships associated therewith are also made inactive;
(3) an attribute cannot be made active unless the entity associated therewith has also been made active;
(4) a relationship cannot be made active unless all of the participating entities are also made active; and
(5) if two or more entities are activated, each activated entity must be connected to another activated entity through an activated relationship.

Replace-label

The labeling operation executed by the schema editor 152 is used to replace the identifiers included within the database dictionary by textual strings descriptive of the application. Labeling may be performed using conventional display editing techniques such as, for example, mouse-click operations or drag-text editing. Through use of the labeling operation an interface designer can modify the text associated with database entities, relationships, and attributes within an SSD. Upon selection of the 'Replace-label' operation from the 'Edit' menu the following operations are performed:

1) An object to be identified through the labeling operation is selected using the object-identification procedure described above with reference to the trimming operation.
2) Subsequent to identification of this object, the interface designer is prompted to supply a new object label. Referring again to the specific example of FIG. 3A, the replace-label operation was used to modify the object labels associated with the database entities, relationships and attributes therein. In particular, the Number, Quantity and Minimum attributes of ITEMS entity were changed to '#,' 'On-Hand,' and 'Reorder Point,' respectively during creation of the ASD diagram shown in FIG. 3A.

Select-Master

Occasionally, users of an interface developed by an interface designer will be capable of discerning relationships between objects displayed in the interface based upon knowledge of the underlying application domain. For example, a user familiar with the database represented by FIG. 4A could be expected to realize that any ITEMS displayed in the user interface are "processed by" the DEPARTMENT entity shown. More generally, however, a user of the interface may not possess sufficient knowledge to remedy the lack of visual representations of the relationships existing between the objects therein. For example, in the interface depicted by FIG. 6 multiple occurrences of the entities ITEM and ORDER are shown simultaneously in the absence of a visual representation of the relationship therebetween. This renders the precise relationship between the ORDER and ITEM entities ambiguous, and illustrates the need to provide a mechanism for specifying such relationships. One way of providing this mechanism is through specification of master-slave (MS) relationships between entities.

In an exemplary implementation master-slave relationships are utilized in applications where two or more entities simultaneously appear within the interface. In such instances one of the entities, i.e., the master, is identified as the focus of the application. The values associated with other entities, i.e., "slaves", are presumed to be related to those of the master. In accordance with the invention, a visual differentiation mechanism is employed to assist interface designers in distinguishing between master and slave entities. For example, the entity-highlighter associated with the master entity ORDER 109 in FIG. 6 suggests that the occurrences of the slave entity ITEMS belong to that ORDER.

Master-slave (MS) relationships between entities may be either static or dynamic. Specifically, the relationship is static if the master entity is specified by the interface designer during the development process. In contrast, dynamic relationships are created when users of the interface are given the opportunity to designate the master entity. Static master-slave relationships afford the interface designer the opportunity to create interfaces in which the fields associated with the master entity are prominently displayed, e.g., at the top or top-left corner of the interface display. On the other hand, dynamic master-slave relationships provide interface users with increased flexibility in fashioning an interface display. For example, the interface represented by FIG. 6 could be used to display the ITEMS contained in various ORDERS by using the entity highlighter to select ITEMS as the master entity.

Master entities are internally distinguished by means of the master-indicator (M) associated with the nodes of the entity-list in FIG. 4A. Each master-indicator (M) is turned either ON or OFF depending on whether the entity associated therewith has been selected as a master entity. In order to select an entity as a master entity, an editing mode is entered by choosing the 'Select-Master' operation from the 'Edit' menu. Once in this mode an entity to potentially be defined as the master is selected using the object-identification procedure described above with reference to the trimming operation. The following steps are performed subsequent to the selection of each potential master entity:

1) If a master entity ME already exists, and ME is equal to Ei, change the master-indicator (M) of ME to OFF. After performing this operation the ASD will lack a master entity.

2) If a master entity ME is already in existence but ME is not equal to Ei then an error has occurred. A message is then displayed informing the user that definition of a second master entity is not allowed, and the operation is terminated.

3) If a master entity does not exist the master-indicator of Ei is set to ON and the newly selected master entity is displayed in a predefined format (e.g., reverse video).

Set-Occurrence

As is described hereinafter, the ASD interpreter 154 establishes the number of occurrences to be displayed for each active entity in the interface. Specifically, the interpreter 154 assigns single-occurrence (S) entities (e.g. ITEMS and DEPARTMENTS in FIG. 7) to a text field, while multiple-occurrence (M) entities (e.g. ORDERS and SUPPLIERS in FIG. 7) are displayed in the form of data tables. In the exemplary implementation of FIG. 7 single-occurrence and multiple-occurrence entities are represented using rectangular blocks having thin and thick borders, respectively.

The following procedure is employed to toggle the value of a particular occurrence indicator upon selection of the 'Set-Occurrence' operation from the 'Edit' menu:

1) The object-identification procedure described above in connection with the 'Trim' operation is employed to identify an entity (E) of interest.

2) Let O denote the occurrence indicator of the entity E.

3) If the value of O is set to 'single' (S), change it to 'multiple' (M). Otherwise change the value of O from 'multiple' (M) to 'single' (S).

4) Redisplay the entity E using a thin-lined rectangular icon if the occurrence indicator is set to (S), and a thick line if the occurrence indicator is set to (M).

As mentioned above, the purpose of the interpreter module 154 is to convert the database specification created using the specification tool 129 into the block description files (BDFs) 130 processed by the block layout generator 134 (FIG. 1).

There exist three types of BDFs:

(1) menu BDFs, containing a list of the operations requested using the specification tool 129;

(2) data BDFs, where each data BDF contains information pertaining to one of the entities included in the database structure specified using the specification tool 129; and (3) relationship BDFs, where each relationship BDF contains information pertaining to one of the relationships between entities specified using the specification tool 129 (e.g., the "played for" relationship of FIG. 2).

The BDFs are structured in the following manner:

```
Menu BDF
                <operation 1>
                <operation 2>
                    •
                    •
                    •
                <operation N>
Data BDF
                <entity_name>
    <field_name_1 > <type> <width> <height> <label>
    <field_name_2 > <type> <width> <height> <label>
                    ...
    <field_name_M> <type> <width> <height> <label>
Relationship BDF
                <relationship_name>
        <label> <width> <height> <cardinality>
    <field_name_1> <type> <width> <height> <label>
    <field_name_2> <type> <width> <height> <label>
                    ...
    <field_name_P> <type> <width> <height> <label>
```

There exists a unique menu BDF for each database structure specified using the interface specification tool 129. Similarly, the number of data and relationship BDFs associated with a specified application corresponds to the number of entities and relationships represented in the application specification diagram generated using the specification tool 129.

As noted above, the 'Schema' and 'Interpreter' operations are also available to interface designers from the menu bar shown in FIG. 2. The 'Schema' pull-down menu allows selection of either a Load or a Clear operation (FIG. 8B). The Load operation prompts the user for the name of a database using, for example, a graphics window such as is shown in FIG. 9. The database name supplied by the user is then associated with a target data dictionary such as is shown in FIG. 5. This specification of a target data dictionary initiates the above-described process of generating an SSD corresponding to the target data dictionary. Selection of the Clear operation clears the graphics area and initializes the internal data structure in which is stored an SSD and an ASD associated therewith.

Selection of the 'Interpret' pull-down menu (FIG. 10) signals the interpreter 154 to begin mapping the information contained within a particular application specification diagram (ASD) into the menu, data, and relationship block description files 130 processed by the block layout generator 134. In accordance with the invention, the entities and associated attributes within a given ASD are mapped to fields within the resultant graphical user interface (GUI). Relationships between entities are inferred from the layout of the interface and from the semantics of the object labels utilized therein.

Figure 12:
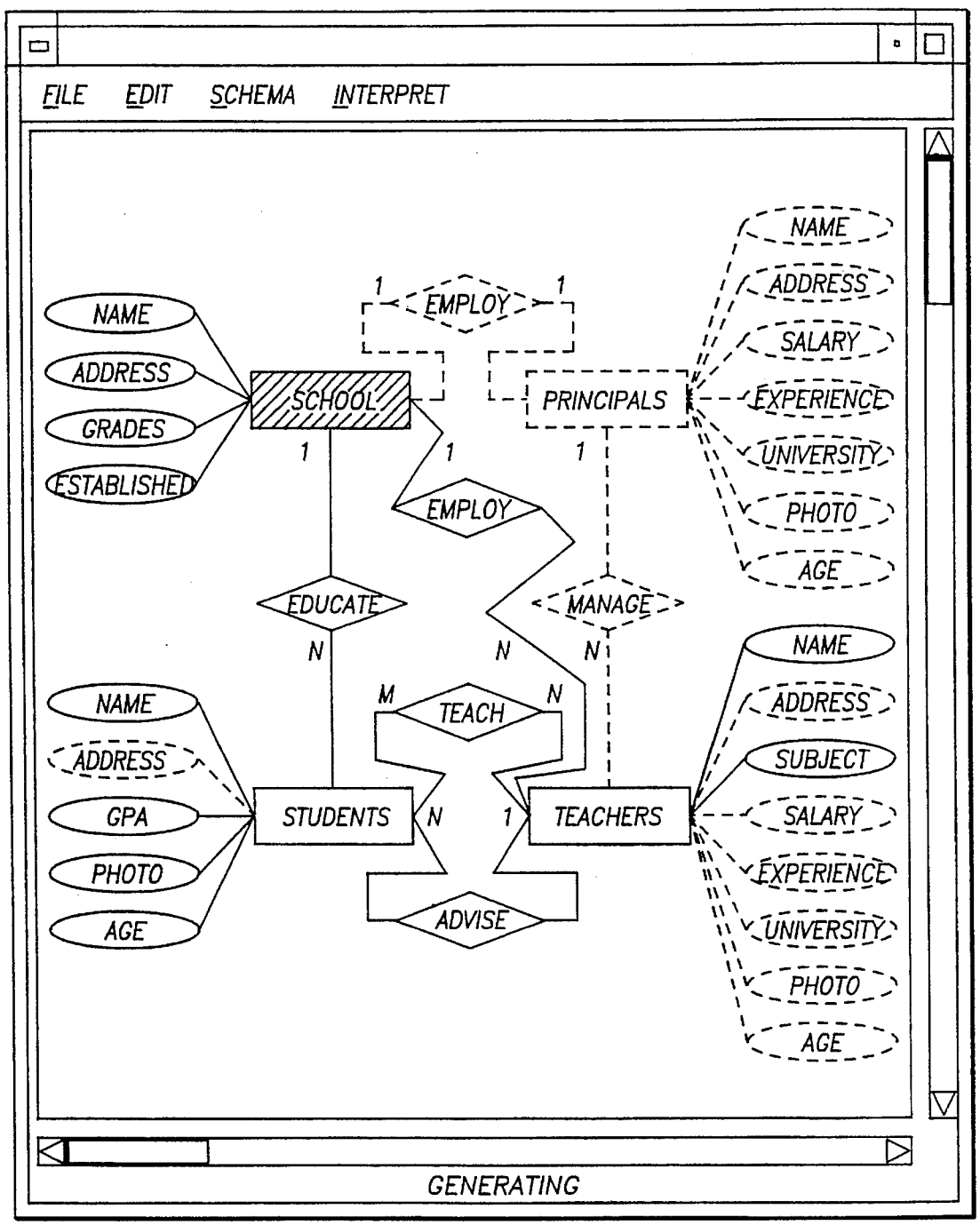
FIG. 12 depicts a screen display corresponding to a particular application specification diagram (ASD).

As was previously noted, the output of the interpreter 154 is stored in the form of block definition files 130 supplied to the block layout generator 134. The block definition files contain information relating to the attributes (names, types, sizes, . . . ) associated with each entity. The interpreter 154 is operative to convert a given ASD (e.g., FIG. 12) into a block precedence tree BPT (e.g., FIG. 13) in which the nodes and branches respectively correspond to entities and relationships within the ASD. This conversion process is implemented differently depending upon whether cyclical relationships exist between entities within the ASD. A "cycle" exists within the ASD when a first entity is related to another through more than a single relationship path. Referring to the ASD of FIG. 12, the following cycles are seen to exist:

(i)   SCHOOL-"employs"-PRINCIPALS-"manage"-TEACHERS, and
(ii)  SCHOOL-"educates"-STUDENT-"taught-by"-TEACHER In instances where only a single relationship path exists between each pair of entities within a given ASD, the resulting BPT is generated as follows:

1) Let E0 and E1 respectively represent the first and $I^{th}$ entities within the database schema diagram associated with the given ASD.

Figure 13:
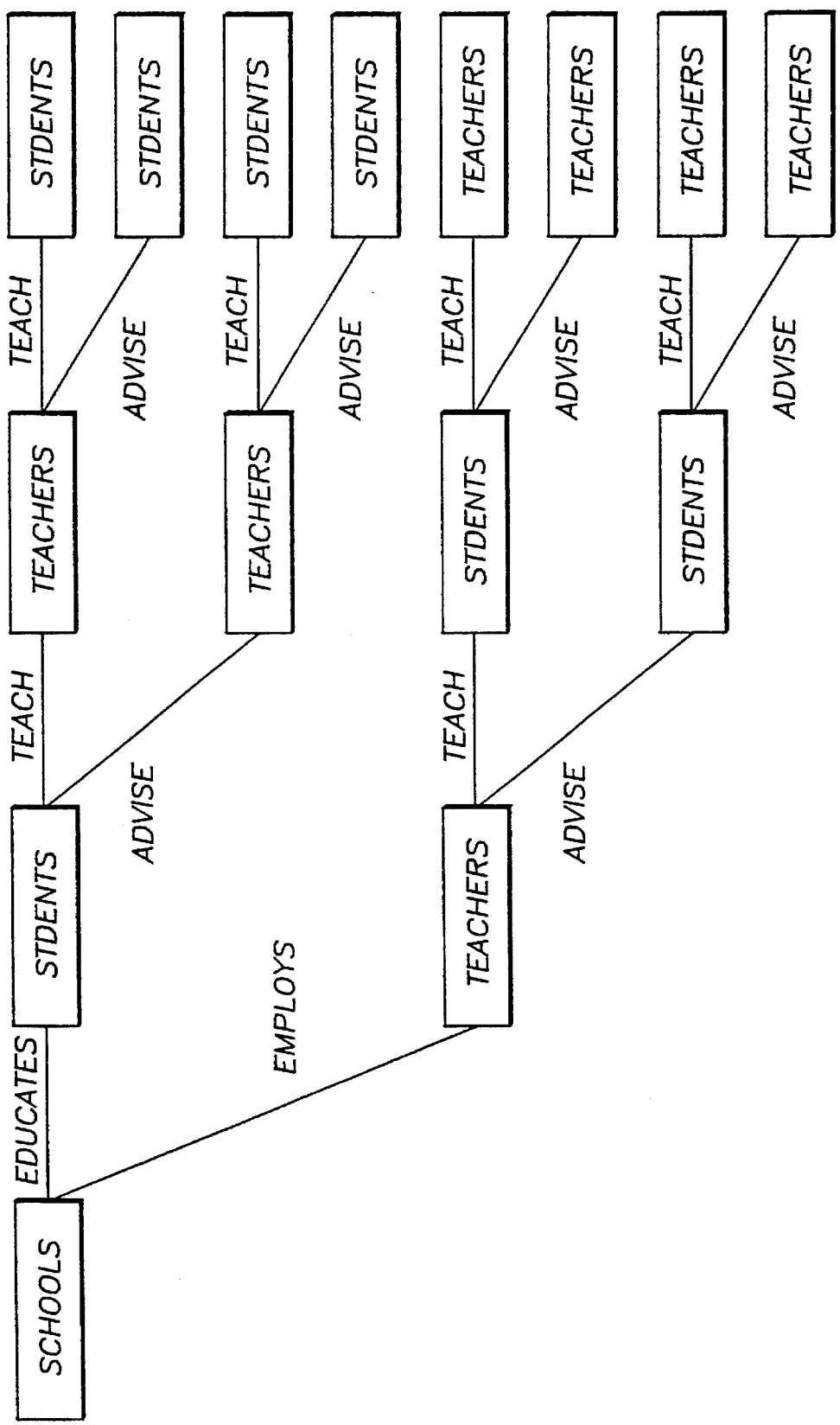
FIG. 13 shows a block precedence tree (BPT) having nodes and branches respectively corresponding to entities and relationships depicted within the ASD of FIG. 12.

2) Create a node N(E0) corresponding to the root of the BPT (FIG. 13).

2) For each Relationship R(E0, E1) within the ASD:
   Create a node N(EI) and make N(E0) its parent.
   Assign the name of the relationship R to the branch joining N(E0) and N(EI).

3) Repeat step 2 for each entity El.

The following pseudo-code describes an exemplary recursive procedure used in generating a BPT associated with an ASD containing cycles:

```
/* Definitions */
    Let AE be the set of active entities in the ASD
    Let M be the master entity of the ASD
    If there is no master entity, let M be any member of AE
    Let P be a set of relationship-types
/* Procedure BPT */
    node create_bpt() {
        N = create_node(M)
        P = 0
        create_children(N, M, P)
        return(N)
/* Function Definition */
    create_children(N:node, E:entity, P:ordered-relationship-type-set) {
    /* Definitions */
        Let AR be the set of active relationship types in the ASD in
which E participates
        Let R be a member of AR E'
        Let E' be the second entity in the relationship type R (E,E')
    /* Procedure Link */
        For each R in AR
            if (R is not in P) {
                Add R to P
                N' = create_node(E')
                link(N, N')
                create_children(N', E', P)
            }.
```

It is observed that the membership test "(R is not in P)" set forth above ensures that a relationship-type will not appear twice in any given branch. In this way the BPT is formed so as to eliminate any cyclical relationships between entities within the associated ASD.

Figure 14:
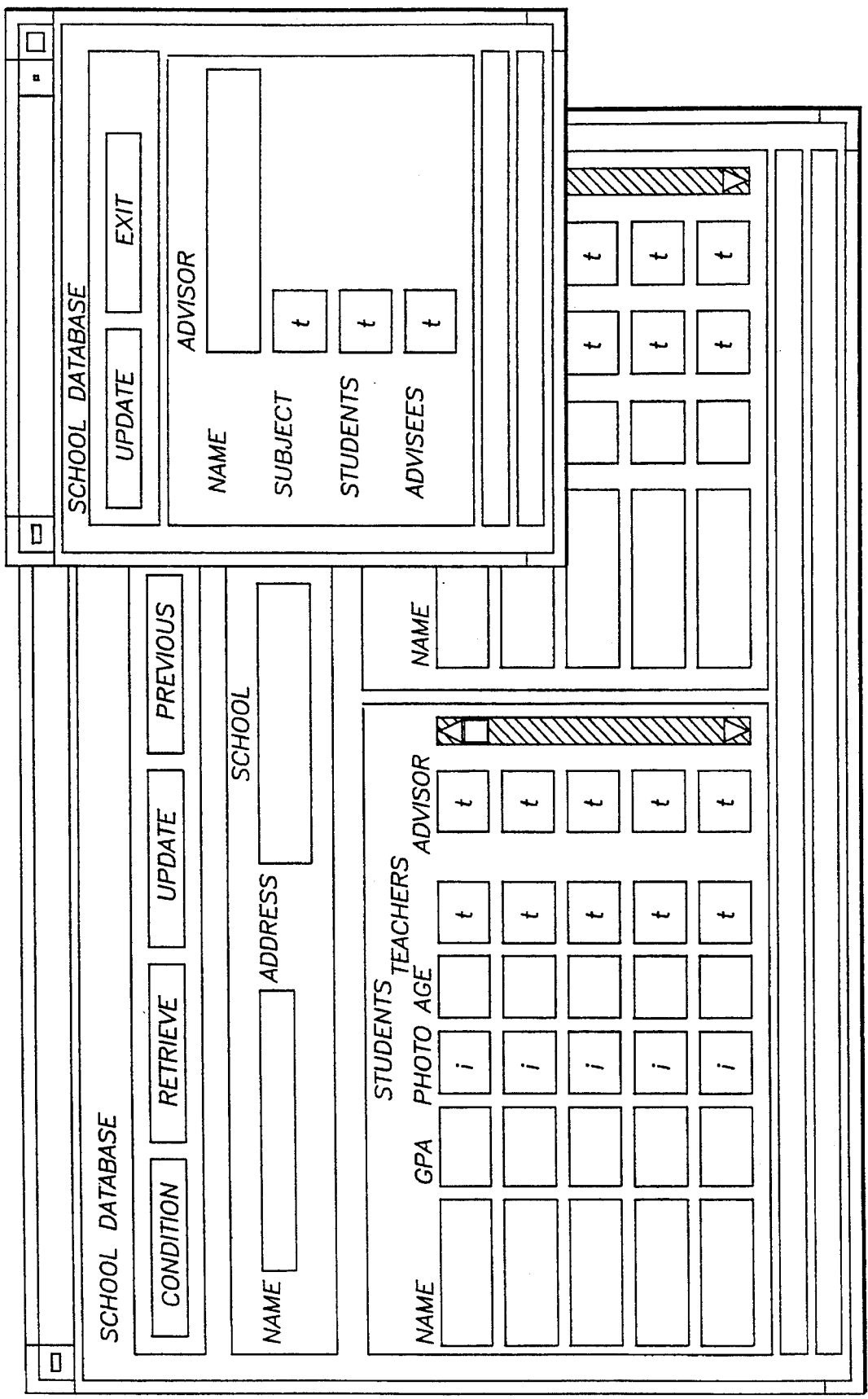
FIG. 14 shows an interface screen generated in accordance with the BPT of FIG. 13 from which the entity "School" has been selected from a menu screen displaying a plurality of entities.

FIG. 13 provides a representation of the BPT obtained by applying the recursive procedure described above to the ASD depicted in FIG. 12. Referring to FIG. 13, the number of nodes in the BPT may exceed the number of active entity and relationship-types. In these cases it may be difficult to include all of the desired information in a single-screen user interface. Accordingly, in a preferred embodiment the interface may initially be presented to the user in the form of a menu screen displaying a set of button-type icons representative of the active entities within the BPT. A label associated with each such icon will preferably bear the name of a particular entity, thereby allowing information related to the corresponding entity to be displayed upon selection of the icon. In certain cases the relationships associated with a selected entity may be so numerous that the interface display is segmented into several screens connected by various linking files, i.e., "Links". In this way a user is provided direct access to information relating to a master entity and its most significant attributes and relationships, and indirect access to attributes and relationships of less importance. FIG. 14 shows the screen of an interface based upon the BPT of FIG. 13 in which the entity "School" has been selected from a menu screen displaying a plurality of entities having attributes segmented using Links. In addition, FIG. 14 depicts a graphics window through which information relating to a particular attribute, i.e., Advisor, is obtained by selecting an "Advisor" icon from the "student" DataTable.

The introduction of Links requires modification of the manner in which block definition files are generated by the ASD interpreter 154. This arises as a consequence of the extension of attribute lists to include Link definitions, and as a result of the segregation of block definition files into primary or secondary blocks. Extended attribute lists may be processed by the screen layout generator in the same manner as attribute lists lacking Link definitions since such definitions can be treated as a special type of field for which the only available widget selection corresponds to a button icon. In the preferred embodiment segregated block definition files are processed by creating a single screen layout for the main blocks, and separate screen layouts for each of the secondary blocks.

Methodology of Interface Generation

Figure 15:
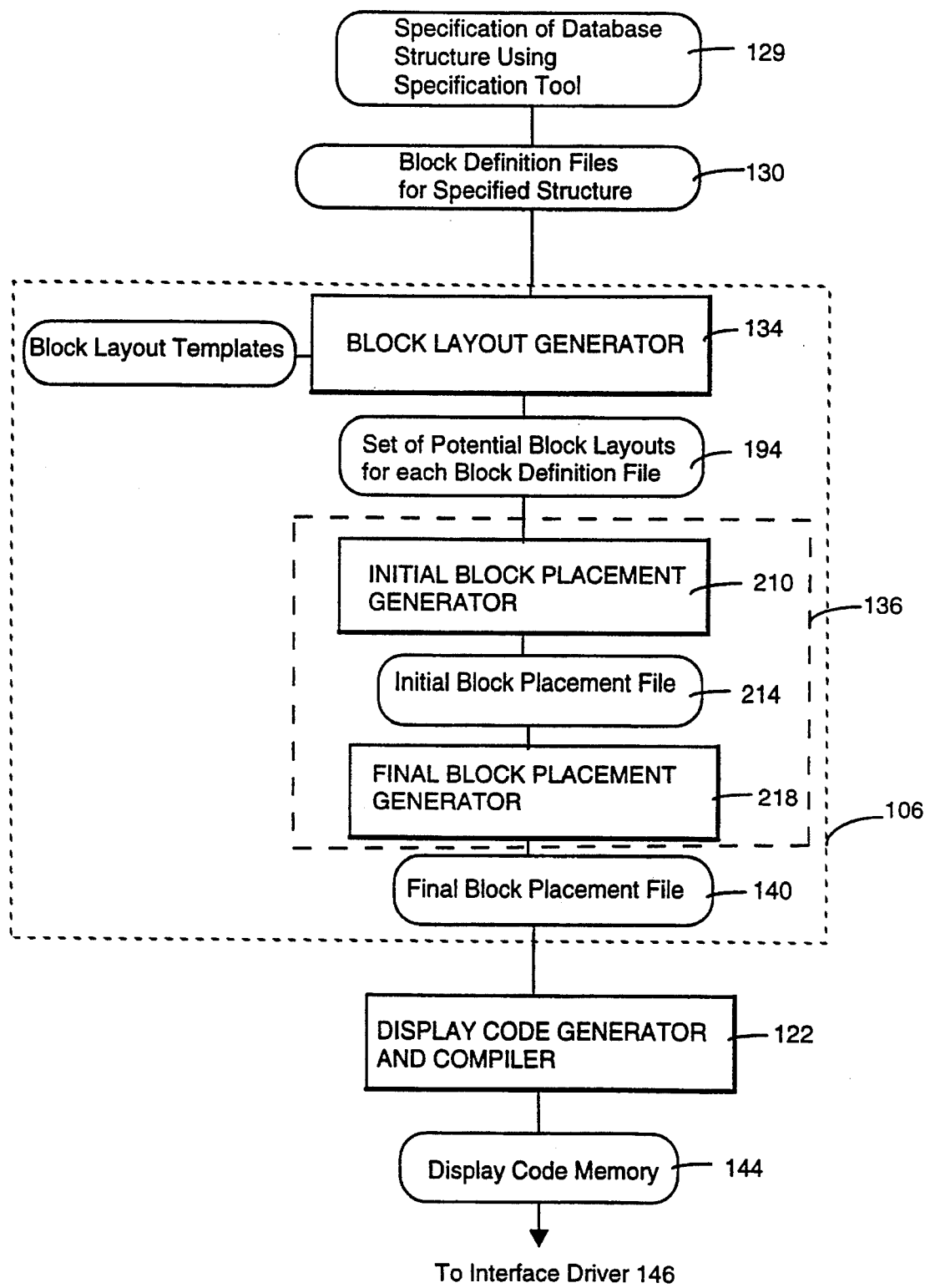
FIG. 15 is a functional block diagram representative of a preferred manner of generating an interface layout in accordance with the present invention.

Referring to FIG. 15, there is shown a functional block diagram representative of a preferred manner of generating an interface layout in accordance with the present invention. As shown in FIG. 15, a set of block description files 130 are generated by the interpreter module in accordance with a data structure defined by the specification tool 129. A set of interface object blocks for each block description file 130 are then created by the block layout generator 134 by varying the arrangement, spacing and graphical representation of data fields included within the object blocks. Each data field is defined by a segment of graphics software hereinafter denoted as a widget. Each interface object block has associated therewith a "quality" parameter based on predefined block configuration guidelines and constraints related to the selection and location of widgets within the object block. Guidelines are formulas which yield various scores used in computing the quality parameter, while constraints describe conditions which must be satisfied if a particular design is to be considered acceptable. Typical constraints include "two fields may not overlap ", "the width and height must not exceed the space allocated", and "the number of fields within the object block must be less than N".

Figure 16:
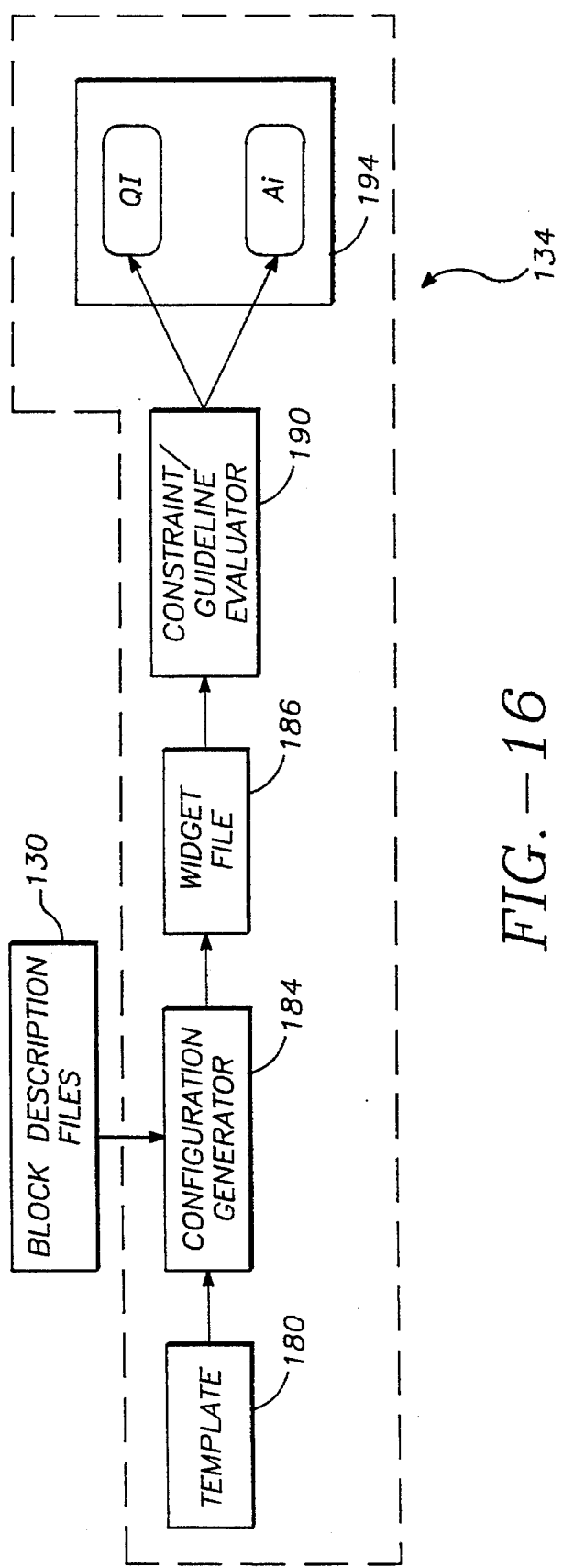
FIG. 16 is a block diagrammatic representation of the components comprising a block layout generator included within the present invention.

FIG. 16 is a block diagrammatic representation of the components comprising the block layout generator 134. The layout generator 134 operates to create the set of interface object blocks corresponding to each block description file 130 based on information included within a corresponding set of templates 180. Each template 180 is a data structure which includes information enabling the generation of multiple interface object blocks. More specifically, each template 180 includes a Representation Section which assigns each data field within the object block to a particular widget class (e.g., Text, ScrolledText, Scale, Button). Attributes associated with each widget class (e.g., font size, dimensions, color) are defined within a Local Attributes Section. The Local Attributes Section also includes information relating to the size of the margins between the perimeter of the object block and the data fields, the spacing between data fields, and the like. The placement of data fields within each object block is performed in accordance with a Layout Plan stored within each template 180. For example, the Layout Plan included within a particular template 180 may specify that the data fields within a first object block associated with the template be arranged in a single column, that the data fields be arranged in two columns in a second object block, that the data fields be arranged in three columns in a third object block, and so on. In a preferred implementation each of the templates 180 will be structured as follows:

```
/* Representation section */
<obj_1>        <widget_type>
<obj_2>        <widget_type>
...            ...
<obj_N>        <widget_type>
/* Local attributes */
    FontSize = #;
    FontStyle = [P,B,I]; /* P = plain, B = bold, I = italic */
    UperMargin = ##; /* separation between the upper border and
topmost widget */
    LowerMargin = ##; /* separation between the lower
border and the lowermost widget */
    LeftMargin = ##; /* separation between the left border and
the [lowermost] leftmost widget */
    RightMargin = ##; /* separation between the right
border and the rightmost widget */
    FieldSeparation = ##; /* distance between fields */
    FieldLabelSeparation = ##; distance between a field and
its label */
    ColumnSeparation = ##; /* distance between columns
*/
    /* Layout plan */
    <function>
```

Each template 180 is defined in a separate file. As is described more fully below, the template files are read and interpreted by a configuration generator 184 (FIG. 16). With the exception of the Layout Plan, the values of each parameter within a template file can be independently modified. In a preferred embodiment each Layout Plan will be written in C-code, then compiled and linked into software included within the configuration generator 184. A set of Layout Plans included within preferred implementations of the templates. 180 are set forth below:

DEFINITIONS

Variables:

| | |
|---|---|
| N | :Number of widgets to be [laid] laid out: |
| W[i] | :i-th widget |
| W[i].width | :Widget.width |
| W[i].height | :Widget.height |
| W[i].x_pos | :x-coordinate of the widget position (with respect to the block) |
| W[i].y_pos | :y-coordinate of the widget position (with respect to the block) |

Constants

The following constants are defined in the local attribute section of the template:

InterButtonWidth

InterButtonHeight

LeftMargin

RightMargin

UpperMargin

LowerMargin

HorizontaiField Separation

VerticalFieldLabelSeparation

```
Layout Plan #1: HorizontalMenu()
/*Menu buttons of identical height are arranged in a single row*/
    curr_x=0;
    for(i=1;i<=N;i++){
        W[i].x_pos = curr_x;
        W[i].y_pos = 0;
        curr_x = curr_x + W[i].width + InterButtonWidth;
    }
Layout Plan #2: VerticalMenu()
*Menu buttons of identical width are arranged in a single
column*/
    curr_y = 0;
    for(i=1;i<=N;i++){
        W[i].x_pos = 0;
        W[i].y_pos = curr_y;
        curr_y = curr_y + W[i].height + InterButtonHeight;
    }
Layout Plan #3: ColumnSplit(columns)
/*menu buttons are divided into N columns*/
    total_height = sum(W[i].height);
    curr_x = 0;
    curr_y = 0;
    first = 1;
    for(i=1;i<=columns;i++){
        column_height = total_height/
        (columns-i+1);
        residual = total_height -
        (columns-1+1)*column_height;
        if(residual>0){
            column_height++;
        }
        h = 0;
        last = first;
        while(h<column_height && last <= N){
            h = W[last].height;
            k = h;
            if(last!=first && (h_column_height)>
            W[last].height/2)
                k = k-W[last].height;
            else
                last++;
        }
        last = last - 1;
        total_height = total_height - k;
        widest = max{W[i] : first<=i<=last};
        for(j=first;j<=last;j++){
            W[j].x_pos = curr x;
```

```
            W[j].y_pos = curr_y;
            curr_y = curr_y+W[j].height+InterButtonHeight;
        }
        curr_y = 0;
        curr_x = curr_x+widest+InterButtonWidth;
        first=last+1;
    }
Layout Plan #4: PackedHorizontalTextFieldSet(max_width)
/*Fields are sequentially arranged row by row. A new row is
initiated when the cumulative width of the fields, associated labels,
block margins, and inter-field spacing exceeds a predefined
row width denoted by max_width*/
    curr_x = 0;
    curr_y = 0;
    max_h = 0;
    for(i=1;i<=N;i++){
        if(curr_x+W[i].width>width-LeftMargin){
            curr_y = curr_y + max_h +
            VerticalFieldSeparation;
            curr_x = 0;
            max_h = 0;
        }
        W[i].x_pos = curr_x;
        W[i].y_pos = curr_y;
        curr_x = curr_x + W[i].width +
        HorizontalFieldSeparation;
        max_h = max(max_h,W[i].height);
    }
Layout Plan #5: ColumnSplit(columns)
/*This routine partitions the data fields of an object block into
N columns*/
    total_height = sum(W[i].height);
    curr_x = 0;
    curr_y = 0;
    first = 1;
    for(i=1;i<=columns;i++){
        column_height=total_height/(columns-i+1);
        residual=total_height - (columns-1+1)
        *column_height; if (residual>0){
            column_height++;
        }
        h=0;
        last=first;
        while(h<=column_height && last<=N){
            h+=W[last].height;
            k=h;
            if(last!=first && (h-column_height)>
            W[last].height/2)
                k-=W[last].height;
            else
                last++;
        }
        last = last-1;
        total_height=total_height-k;
        widest = max{W[i] : first<=i<=last}{;
        for(j=first;j<=last;j++){
            W[j].x_pos = curr_x;
            W[j].y_pos = curr_y;
            curr_y = curr_y+W[j].height+
            VerticalFieldSeparation;
        }
        curr_y = 0;
        curr_x = curr_x+widest+HorizontalFieldSeparation;
        first=last+1
    }
```

FIG. 17A shows an example of a template 180 which, together with a block description file 130, is utilized by the layout generator 134 to produce a set of three object blocks (FIGS. 17B–17D). In the example of FIG. 17A the Layout Plan denoted as 'column_split ({1,2,3})' includes instructions specifying that each of the data fields (e.g., Name, Sex, Experience, . . . ) within the object block of FIG. 17B be configured in a single column, and that the data fields within FIGS. 17B and 17C be arranged in a pair of columns, and in multiple columns, respectively.

As is indicated by FIG. 16, the configuration generator 184 utilizes the set of available templates 180 in order to create the set of object blocks associated with a particular block description file 130. In a preferred embodiment the configuration generator 184 operates to create several object blocks for each template 180 in accordance with the associated Layout Plan. Information relating to the set of object blocks corresponding to each of the block description files 130 is stored within a widget file 186. The widget file 186 specifies the location and type, i.e., widget type, of the data included within the object blocks defined by the widget file 186. The configuration generator 184 appends to the widget file 186 the object block information generated in response to the processing of each block description file 130. The following pseudocode routine is representative of a preferred manner in which the set of object blocks corresponding to one of the block description files (BDFs) 130 are generated by the configuration generator 184:

For each BDF
  For each template
    For each field
      Generate a widget description using the information provided in the Representation Section of the template and the characteristics of the field included within the Data Dictionary. For example, the "Name" field within the template of FIG. 18A is assigned the widget Text-Field(N), where TextField is the type of widget associated with the descriptor "Text" and the value N is the length of the field defined in the Data Dictionary.
    Call the layout routine specified in the Layout Plan section of the template.

The format of the widget file 186 is as follows:

```
<block_description_1>
    <widget_description_11>
    <widget_description_12>
    <widget_description_1M1>
    ...
<block_description_2>
    <widget_description_21>
    <widget_description_22>
    ...
    <widget_description_2N2>
    ...
<block_description_N>
    <widget description N1>
    <widget_description_N2>
    ...
    <widget_description_NMN>
``` where <block_descriptor_X> denotes the Xth object block defined by the widget file 186, and where <widget_description_K > refers to the Kth data field within a given object block. Each <block_descriptor_X> is of the form: <internal_name><configuration_id><number_of_widgets>
The format of<widget_description_K > depends on the type of widget used to represent the associated data field. For example, the widget type defining a data field represented as a menu button is of the following format: <t_up><t_down><t_left><t_right><b_up> <b_down>

<b_left><b_right><label> where {<t_up><t_down>} determine the position of upper and lower horizontal lines and <t_left><t_right>} specify the position of left and right vertical lines which define the smallest rectangle capable of surrounding the label of the menu button icon. Similarly, {<b_up> <b_down><b_left><b_right>} define the rectangular button icon itself. The character string within < label > corresponds to the label identifying the button icon, e.g. INSERT.

The following listing corresponds to a portion of a widget file 186 defining the object blocks (i.e., Menu, PREVIOUS TEAMS and PLAYER) depicted in FIG. 7.

```
M DESCR/MENU          00814 00038 00010 00010 0006
    B 00005 00033 00082 00186 00 00 CONDITION
    B 00005 00033 00191 00295 00 00 RETRIEVE
    B 00005 00033 00300 00404 00 00 UPDATE
    B 00005 00033 00409 00513 00 00 PREVIOUS
    B 00005 00033 00518 00622 00 00 NEXT
    B 00005 00033 00627 00731 00 00 EXIT
T DESCR/Items0001     00814 00068 00010 00068 0011
    L 00005 00024 00067 00746 02 01 *Items
    L 00031 00049 00067 00082 01 01 Id
    T 00031 00063 00087 00153 01 01 —
    L 00031 00049 00158 00224 01 01 Description
    T 00031 00063 00229 00407 01 01 —
    L 00031 00049 00412 00461 01 01 Quantity
    T 00031 00063 00466 00532 01 01 —
    L 00031 00049 00537 00588 01 01 Minimum
    T 00031 00063 00593 00659 01 01 —
    L 00031 00049 00664 00707 01 01 Picture
    B 00031 00063 00712 00746 01 01 i
T DESCR/Departments0002 00814 00068 00010 00398 0009
    L 00005 00024 00093 00721 02 01 Departments
    L 00031 00049 00093 00108 01 01 Id
    T 00031 00063 00113 00163 01 01 —
    L 00031 00049 00168 00204 01 01 Name
    T 00031 00063 00209 00387 01 01 —
    L 00031 00049 00392 00434 01 01 Budget
    T 00031 00063 00439 00521 01 01 —
    L 00031 00049 00526 00578 01 01 Location
    T 00031 00063 00583 00721 01 01 —
D DESCR/Orders0003    00254 00222 00010 00156 0020
    L 00005 00024 00005 00249 02 01 Orders
    L 00029 00047 00005 00051 01 01 Number
    T 00049 00081 00005 00071 01 01 —
    T 00083 00115 00005 00071 01 01 —
    T 00117 00149 00005 00071 01 01 —
    T 00151 00183 00005 00071 01 01
    T 00185 00217 00005 00071 01 01 —
    L 00029 00047 00076 00107 01 01 Date
    T 00049 00081 00076 00158 01 01 —
    T 00083 00115 00076 00158 01 01 —
    T 00117 00149 00076 00158 01 01 —
    T 00151 00183 00076 00158 01 01 —
    T 00185 00217 00076 00158 01 01 —
    L 00029 00047 00163 00229 01 01 Doc_Image
    B 00049 00081 00163 00197 01 01 i
    B 00083 00115 00163 00197 01 01 i
    B 00117 00149 00163 00197 01 01 i
    B 00151 00183 00163 00197 01 01 i
    B 00185 00217 00163 00197 01 01 i
    S 00049 00217 00234 00249 00 00 +
D DESCR/Suppliers0004 00540 00222 00284 00156 0032
    L 00005 00024 00005 00535 02 01 Suppliers
    L 00029 00047 00005 00020 01 01 Id
    T 00049 00081 00005 00055 01 01 —
    T 00083 00115 00005 00055 01 01 —
    T 00117 00149 00005 00055 01 01 —
    T 00151 00183 00005 00055 01 01 —
    T 00185 00217 00005 00055 01 01 —
    L 00029 00047 00060 00096 01 01 Name
    T 00049 00081 00060 00198 01 01 —
    T 00083 00115 00060 00198 01 01 —
    T 00117 00149 00060 00198 01 01 —
    T 00151 00183 00060 00198 01 01 —
    T 00185 00217 00060 00198 01 01 —
    L 00029 00047 00203 00246 01 01 Address
    T 00049 00081 00203 00341 01 01 —
    T 00083 00115 00203 00341 01 01 —
    T 00117 00149 00203 00341 01 01 —
    T 00151 00183 00203 00341 01 01 —
    T 00185 00217 00203 00341 01 01 —
    L 00029 00047 00346 00408 01 01 Telephone
    T 00049 00081 00346 00428 01 01 —
    T 00083 00115 00346 00428 01 01 —
```

```
T 00117 00149 00346 00428 01 01 —
T 00151 00183 00346 00428 01 01 —
T 00185 00217 00346 00428 01 01 —
L 00029 00047 00433 00458 01 01 Fax
T 00049 00081 00433 00515 01 01 —
T 00083 00115 00433 00515 01 01 —
T 00117 00149 00433 00515 01 01 —
T 00151 00183 00433 00515 01 01 —
T 00185 00217 00433 00515 01 01 —
S 00049 00217 00520 00535 00 00 +
```

The values in the widget file 186 are utilized by a constraint and guideline evaluator 190 to determine the value of a quality parameter indicative of the extent to which the arrangement of fields within a particular block comports with predefined guidelines and constraints. Included within a preferred set of guidelines upon which this quality evaluation is based are:

(1) wasted space (WS), where WS=Σwidget_area(i)/block area where block area corresponds to the area of the minimum rectangle capable of enclosing each of the data fields within the object block while maintaining a specified margin offset between each data field and the border of the minimum enclosing rectangle.

(2) balance (B) of the fields within the object block, where B is computed by (i) dividing the block area into four quadrants, and (ii) comparing the area covered by the fields in each quadrant with the expected field coverage in a perfectly balanced layout, i.e. Σwidget_area(i)/4.

(3) cursor movement (C), where C corresponds to the sum of the distance, i.e., number of display pixels, between the last position of field $F_i$ and the first position of field $F_{i+1}$.

Each guideline will preferably be implemented using object-oriented code (e.g., C++), and may be defined as a function of the form:

score function (block_descriptor, {widget_descriptors}).

A set of constraints preferably used by the evaluator 190 include:

(1) Fields cannot overlap, (2) the width of the block cannot exceed W, and (3) the height of the block cannot exceed H, where W and H are constants determined by the dimensions of the display area of display unit 128.

Constraints may also be defined in terms of functions. However, constraint functions are formulated to return a value of zero if the constraint is satisfied and a value of K if the constraint is violated. K may be chosen to be arbitrarily large in order to guarantee that the object block violating the constraint will not be considered during the block placement procedure described below. The quality (QI) of the Ith object block evaluated by the guideline and constraint evaluator 190 is determined in accordance with the following weighted sum:

$$QI = \Sigma Sg(i)W(i) + Sc(i)$$

where Sg(i) corresponds to the score of the ith guideline, Sc(i) corresponds to the score of the ith constraint, and ΣW(i)=1. The value of QI is inversely proportional to the degree to which the layout of an object block agrees with the set of guidelines and constraints. In addition, the values of the weighting coefficients W(i) are selected on the basis of the relative importance of each guideline to a desirable data field arrangement.

The constraint and guideline evaluator 190 also determines values of global attributes (Ai) for each object block (e.g., width, height, font_size, color). The values of Ai, together with the values of the associated quality parameters QI, are placed in a block file 194 organized as follows:

<block_1><attr_1><attr_2><attr_3>. . . <attr_N><QI>

Referring again to FIG. 15, the block placement routine 136 includes an initial block placement generator 210 for arranging a set of object blocks in an initial configuration. Each block description file 130 is represented by a single object block within the set of object blocks selected by the initial placement generator 210, which are stored within an initial block placement file 214. As is described below, during the block placement process other object blocks representative of a particular description file 130 may be substituted for the block initially chosen by the initial placement generator 210. Such substitutions will be made in accordance with a placement procedure effected by the final block placement generator 218 (FIG. 15), which is designed to optimize the final placement of blocks within the interface.

The final block placement generator 218 operates to arrange a set of object blocks into an interface layout in accordance with an iterative improvement heuristic known as simulated annealing (see, e.g., S. Kirkpatrick, C. D. Gelart and M. P. Vecchi, "Optimization by Simulated Annealing," Science, Vol. 20, No. 4598, May 1983, pp. 671–680). The simulated annealing procedure is based on the use of a probability function to randomly move through a solution space. In the present instance, the solution space corresponds to every potential arrangement within the database interface of a set of object blocks corresponding to the specified set of block description files 130. Subsequent to each iteration the "quality" of the solution is compared with that corresponding to the solution obtained during the previous iteration. In general, a new solution is accepted only if it represents an improvement over a prior solution. However, in order to avoid being constrained to the solution space proximate a local minimum the simulation annealing function accepts Certain inferior solutions. The following pseudo-code is descriptive of the simulated annealing procedure:

```
Simulated Annealing
    Initialize;
    placement = GenerateInitialPlacement;
    cost = Evaluate(placement);
    while(loop_count<MAX_ITERATIONS and temperature
>MIN_TEMPERATURE)
        new_placement = Perturb(placement)
        new_cost=Evaluate(new_placement);
        if (Accept(new_placement, new_cost,temperature))
            placement=new_placement;
            cost=new_cost;
        loop_count++;
        temperature=NewTemperature(loop_count);
    return(placement,cost);
```

Referring to FIGS. 18A–C, in a preferred embodiment a slicing tree data structure is used to represent the block placements manipulated by the initial and final block placement generators 210 and 218. In particular, the leaves of the slicing tree structure of FIG. 18A represent the object blocks included within the block placement (configuration) of FIG. 18B. The interior nodes of the slicing tree are indicative of horizontal and vertical cuts which separate the interface layout into a configuration of adjacent rectangles. Information stored in memory locations corresponding to each leaf node includes the geometry and size of the corresponding object block, as well as a justification code describing the position of the object block within the rectangle formed by the surrounding cuts. FIG. 18C shows one set of acceptable justifications of an object block relative to the rectangle defined by the surrounding cuts. In a preferred implementation the following convention is used to interpret the left and right children of a horizontal (H) node: the left child of a horizontal node is always located above the right child. Similarly, the left child of a vertical (V) node is always to the left of the right child.

Figure 19B:
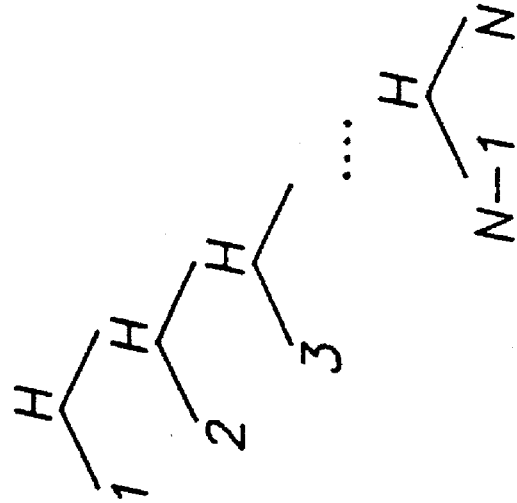
FIG. 19B is a sliced tree data representation corresponding to the initial interface placement of FIG. 19B.
Figure 19A:
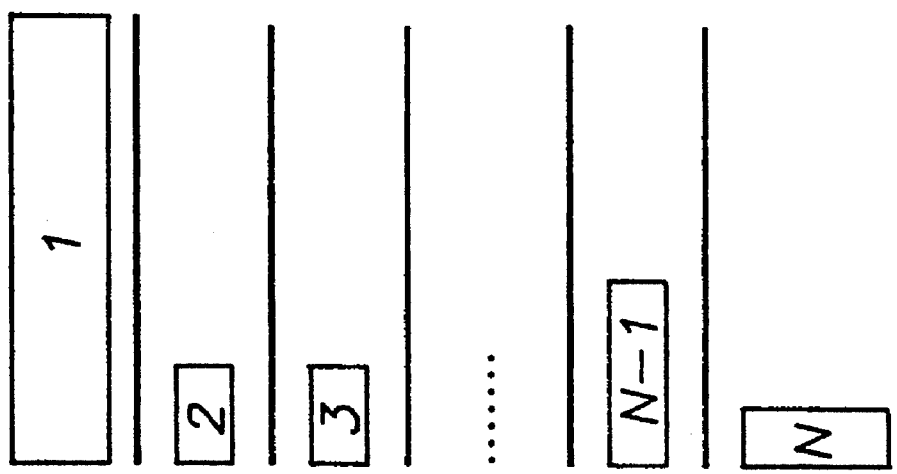
FIG. 19A depicts an initial interface placement of object blocks corresponding to each of N block description files.

The initial placement generator 210 will preferably be implemented so as to execute the GenerateInitialPlacement function in a manner resulting in the initial object block placement depicted in FIGS. 19A and 19B. In the arrangement of FIG. 19A there is included in the interface one object block corresponding to each of N block description files 130. The N object blocks are arranged in a vertical stack, with the corresponding sliced tree data representation being depicted in FIG. 19B.

As is indicated by the pseudo-code description of the simulated annealing procedure given above, a perturbation step is performed prior to the evaluation conducted during each iteration. The purpose of this perturbation step is to produce a variation of the current placement by applying operations to alter its structure. The Perturb function for implementing this step is structured as follows:

```
Perturb(placement)
    OP=SelectOperation;
    if (BlockCount(OP)=1)
        B1=SelectBlock;
        OP(B1);
    else
        B1=SelectBlock;
        B2=SelectBlock;
        OP(B1,B2);
``` where B1 and B2 are object blocks included within a current configuration of object blocks within the interface. SelectOperation and SelectBlock are random functions (using a uniform probability distribution), while BlockCount is a function that determines the number of object blocks affected by the one of the following OP operations:

| Replace(b) | substitutes a second object block for object block b. |
| Swap(b1, b2) | interchanges the position of two blocks b1 and b2, |
| Move(b1, b2) | places a block b1 next to block b2 |

FIGS. 20A end 20B depict changes occurring to a block configuration as a consequence of execution of the Replace operation. Similarly, FIGS. 21A–B and 22A–B depict the effects of the Swap and Move operations. The following sequence of steps may clarify the manner in which the Move operation is implemented:

1. Remove b1 and its parent from the tree.
2. Connect b1's sibling to its grand parent.
3. Disconnect b2 from the tree and connect it to b1's parent.
4. Reconnect b1's parent to the tree at the location where b2 was removed.

The final block placement generator 218 implements the simulated annealing procedure by computing a cost evaluation function C(i), where C(i) corresponds to the "cost" of the block configuration existing after the ith perturbation operation. Four cost components are considered when determining the value of the cost evaluation function Evaluate:

C1=Σ(BQ(i)/N) where BQ(i) is the quality score assigned to the ith of N object blocks included within the current configuration (placement) of object blocks within the interface;

C2=Placement Wasted Space (PWS), where PWS is a recursive function that traverses the placement tree in order to determine the difference between the size of each block and its allotted area.

C3=V if a placement constraint is violated and zero otherwise, where V is selected to be large enough to guarantee that the current placement will not be accepted.

C4=Σ(G(i)/M), where G(i) is the guideline score associated with the ith object block configuration, and M is the number of placement guidelines.

These factors are then combined by the final block placement generator 218 in the following manner in order to determine the cost Ci of the block configuration existing after the ith iteration of the simulated annealing procedure:

$$C=C1W1+C2W2+C3W3+C4W4$$

where $\Sigma Wi=1$. The cost Ci is the value returned by the function Evaluate.

In a preferred implementation of the simulated annealing procedure outlined above block configurations resulting in a cost reduction are always accepted. In addition, block configurations which result in cost increases are accepted with a probability that decreases over time. This aspect of the annealing procedure may be described by an acceptance function (Ac) of the form:

$$Ac=\exp(-\Delta c/Ti)$$

where $\Delta C$ is the difference in cost between the previous and current block configurations, and Ti corresponds to a "temperature" of the ith iteration. The temperature function is defined as:

$$Ti+1=\alpha(T) *Ti$$

where $\alpha(T)$ is a function that returns a real value in the range (0, 1) when called. In a preferred embodiment the function $\alpha(T)$ is a step function of the type typically utilized in applications involving the simulated annealing procedure. As is indicated by the pseudo-code representation of the simulated annealing procedure set forth above, the block placement generator 218 produces a final block configuration after either:

(i) a predefined number (MAX_ITERATIONS) of iterations have been executed, or (ii) the temperature Ti becomes less than the temperature MIN_TEMPERATURE. The final block configuration is then stored within the final block placement file 140.

Figure 11:
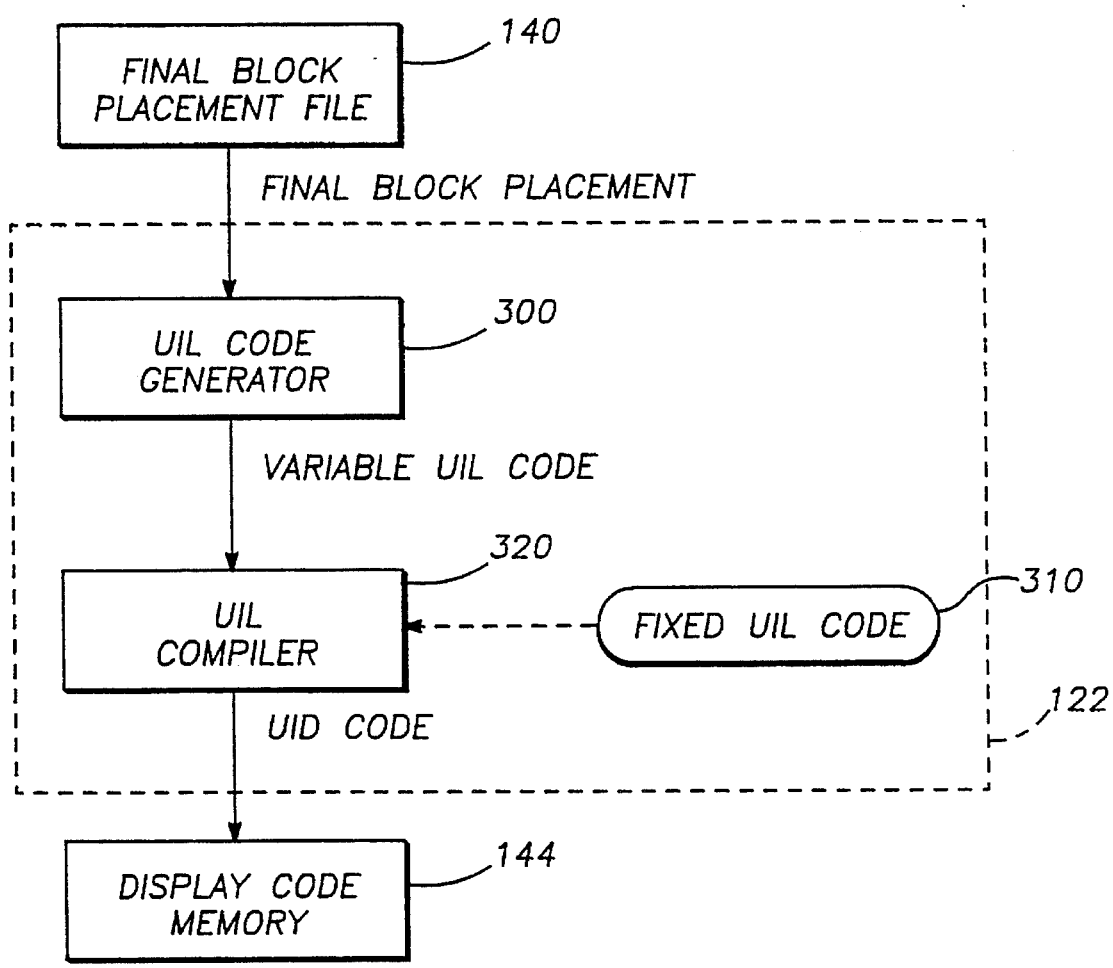
FIG. 11 shows a block diagrammatic representation of a particular implementation of the display code generator and compiler operative to process the final block placement file derived from the block description files.

Referring to FIG. 11, there is shown a block diagrammatic representation of a particular implementation of the display code generator and compiler 122 operative to process the final block placement file 136 derived from the block description files 130 produced by the interpreter 154. Although the implementation of FIG. 11 is described with reference to the User Interface Language (UIL) developed by the Open Software Foundation, Inc., it is understood that in alternative embodiments other user interface languages may be utilized. A UIL code generator 300 produces UIL code on the basis of the final block configuration stored within the final block placement file 140. This UIL code describes characteristics of GUI widgets selected as on-screen representations of the interface objects. Such GUI widgets may be selected from among those included within, for example, the OSF/Motif user environment developed by the Open Software Foundation, Inc. The UIL code is merged with a series of application-independent UIL statements, denoted as fixed UIL code 310, which results in a complete UIL program. This UIL program is then processed by a UIL compiler 320 so as to yield UID code stored in display code memory 144. This display code is used by the interface driver 146 to generate the interface layouts displayed by the display unit 128.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. An automatic interface layout generator for database systems comprising:

means for specifying a set of block descriptions representative of specified portions of a database;

means for generating interface objects to be included within an interface of said database wherein each of said interface objects corresponds to one of said block descriptions and includes a plurality of layout fields;

means for determining a layout quality parameter for each of said interface objects based on layout of said layout fields within said interface objects;

block placement means for arranging sets of said interface objects into block configurations within said interface; and means for determining a placement quality parameter for each of said block configurations based on a set of block placement rules and on said layout quality parameters, including means for selecting a final block configuration by comparing said placement quality parameters.

2. The automatic interface layout generator of claim 1 wherein said block placement rules include guidelines relating to geometry of said block configurations.

3. The automatic interface layout generator of claim 2 wherein said block placement rules include constraints relating to geometry of said block configuration relative to geometry of said interface.

4. The automatic interface layout generator of claim 1 wherein said layout quality parameters are determined in accordance with layout guidelines relating to distribution of said layout fields within said interface objects.

5. The automatic interface generator of claim 4 wherein said layout guidelines include:

a wasted space guideline corresponding to the ratio of area occupied by a first set of said layout fields included within one of said interface objects to area occupied by said one interface object, and a balance guideline related to uniformity of distribution of said first set of layout fields over predefined regions of said one interface object.

6. The automatic interface generator of claim 1 wherein said means for generating interface objects includes means for generating a set of interface objects for each of said block descriptions by varying placement of said layout fields among said objects included within said set of interface objects.

7. The automatic interface generator of claim 6 wherein each of said layout fields corresponds to one of a plurality of widget types, and wherein said means for generating a set of interface objects for each of said block descriptions includes means for assigning a widget type to each of said layout fields.

8. The automatic interface generator of claim 1 wherein said block placement means includes means for iteratively arranging sets of said interface objects into block configurations on the basis of a simulated annealing procedure in which a pair of said placement quality parameters corresponding to a pair of said block configurations generated during successive iterations of said annealing procedure are compared so as to determine which of said pair of placement quality parameters is utilized in a subsequent iteration of said annealing procedure.

9. The automatic interface generator of claim 8 further including means for perturbing said simulated annealing procedure in accordance with a perturbation function.

10. The automatic interface generator of claim 1 further including code generator means for generating code corresponding to a display representation of said final block configuration.

11. The layout generator of claim 1 wherein said means for specifying a set of block descriptions includes means for generating, based on information included within said database, a schema diagram representative of relationships and attributes associated with a set of database entities defined within said database.

12. The layout generator of claim 11 further including schema editor means for transforming said schema diagram into an application specification diagram.

13. The layout generator of claim 12 further including interpreter means for generating said block descriptions in accordance with said application specification diagram.

14. A method for automatically generating an interface layout for a database comprising the steps of:

specifying a set of block descriptions representative of specified portions of said database;

generating interface objects, based on said block descriptions, for inclusion within an interface of said database wherein each of said interface objects has a plurality of layout fields and each of said block descriptions has associated therewith a set of said interface objects;

determining a layout quality parameter for each of said interface objects based on layout of said layout fields within said interface objects;

arranging first and second groups of said interface objects into first and second block configurations, respectively, within said interface wherein each of said groups includes an interface object from each of said sets of interface objects; and determining first and second placement quality parameters for said first and second block configurations, respectively, based on a set of block placement rules and on said layout quality parameters, and selecting a final block configuration by comparing said first and second placement quality parameters.

15. The method of claim 14 wherein said step of specifying a set of block descriptions includes the step of generating, based on information included within said database, a schema diagram representative of relationships and attributes associated with a set of database entities defined within said database.

16. The method of claim 15 further including the step of transforming said schema diagram into an application specification diagram.

17. The method of claim 14 further including the step of generating said block descriptions in accordance with said application specification diagram.

* * * * *